(12) United States Patent
Kim et al.

(10) Patent No.: US 12,395,752 B2
(45) Date of Patent: Aug. 19, 2025

(54) IMAGE SENSOR WITH LOW NOISE AND HIGH RESOLUTION AND OPERATING METHOD THEREOF

(71) Applicant: Samsung Electronics Co., Ltd., Suwon-si (KR)

(72) Inventors: Kyungmin Kim, Suwon-si (KR); Mira Lee, Suwon-si (KR); Minsun Keel, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 231 days.

(21) Appl. No.: 18/059,723

(22) Filed: Nov. 29, 2022

(65) Prior Publication Data

US 2023/0171515 A1 Jun. 1, 2023

(30) Foreign Application Priority Data

Dec. 1, 2021 (KR) .................. 10-2021-0170237
Jun. 29, 2022 (KR) .................. 10-2022-0079991

(51) Int. Cl.
*H04N 25/46* (2023.01)
*H04N 25/42* (2023.01)
*H04N 25/51* (2023.01)
*H04N 25/533* (2023.01)
*H04N 25/78* (2023.01)

(52) U.S. Cl.
CPC ............. *H04N 25/46* (2023.01); *H04N 25/42* (2023.01); *H04N 25/51* (2023.01); *H04N 25/533* (2023.01); *H04N 25/78* (2023.01)

(58) Field of Classification Search
CPC ........ H04N 25/42; H04N 25/46; H04N 25/51; H04N 25/533; H04N 25/78
See application file for complete search history.

(56) References Cited

U.S. PATENT DOCUMENTS

| | | |
|---|---|---|
| 8,508,637 B2 | 8/2013 | Han et al. |
| 9,137,452 B2 | 9/2015 | Han |
| 9,584,742 B2 | 2/2017 | Park et al. |
| 10,178,329 B2 | 1/2019 | Vogelsang et al. |
| 10,798,322 B2 | 10/2020 | Smith et al. |
| 10,833,114 B2 | 11/2020 | Kim et al. |
| 2006/0077269 A1 | 4/2006 | Kindt et al. |

(Continued)

OTHER PUBLICATIONS

European Office Action dated Feb. 28, 2023 for corresponding EP Patent Application No. 22210377.2.

*Primary Examiner* — Lin Ye
*Assistant Examiner* — Chriss S Yoder, III
(74) *Attorney, Agent, or Firm* — Harness, Dickey & Pierce, P.L.C.

(57) ABSTRACT

An image sensor includes a pixel array including a plurality of pixels, a readout circuit configured to generate a digital signal from the pixel signal received from the pixel array, and a signal processor configured to determine whether to perform a binning on a first pixel group and a second pixel group among the plurality of pixels based on at least one of a first value of the digital signal corresponding to the first pixel group and a second value corresponding to the second pixel group adjacent to the first pixel group, and generate image data based on a first operation with the first value and the second value are used as operands when the binning being determined to be performed.

20 Claims, 23 Drawing Sheets

(56) References Cited

U.S. PATENT DOCUMENTS

| | | |
|---|---|---|
| 2007/0132864 A1 | 6/2007 | Tsuruoka |
| 2008/0024618 A1* | 1/2008 | Lim ........................ H04N 23/71 |
| | | 348/222.1 |
| 2011/0085729 A1 | 4/2011 | Shi et al. |
| 2012/0281121 A1* | 11/2012 | Kim ........................ H04N 25/50 |
| | | 348/E5.079 |
| 2015/0070550 A1 | 3/2015 | Shi |
| 2019/0014276 A1* | 1/2019 | Cheung .................. H04N 25/78 |
| 2020/0310126 A1 | 10/2020 | Otsuka |
| 2020/0348676 A1 | 11/2020 | Zhou et al. |
| 2020/0358971 A1 | 11/2020 | Shim et al. |
| 2021/0120214 A1 | 4/2021 | Byun et al. |

* cited by examiner

IMAGE SENSOR WITH LOW NOISE AND HIGH RESOLUTION AND OPERATING METHOD THEREOF

CROSS-REFERENCE TO RELATED APPLICATIONS

This application is based on and claims priority under 35 U.S.C. § 119 to Korean Patent Application Nos. 10-2021-0170237, filed on Dec. 1, 2021, and 10-2022-0079991, filed on Jun. 29, 2022, in the Korean Intellectual Property Office, the disclosures of which are incorporated by reference herein in their entireties

BACKGROUND

The inventive concepts relate to image sensors, and more particularly, to image sensors with low noise and high resolution and operating methods thereof.

An image sensor is a device for capturing a two-dimensional or three-dimensional image of a subject. The image sensor may generate an image of an object by using a photoelectric conversion device that operates according to the strength of light reflected from the object. To acquire high-quality images, high resolution and good noise characteristics are required for the image sensor.

SUMMARY

The inventive concepts provide image sensors having both high resolution and good noise characteristics, and operating methods thereof.

According to aspects of the inventive concepts, there is provided an image sensor comprising a pixel array including a plurality of pixels, a readout circuit configured to generate a digital signal from a pixel signal received from the pixel array, and a signal processor configured to determine whether to perform a binning on a first pixel group and a second pixel group among a plurality of pixels based on at least one of a first value of the digital signal corresponding to the first pixel group and a second value of the digital signal corresponding to the second pixel group adjacent to the first pixel group, and generate image data based on a first operation with the first value and the second value as operands when the binning is determined to be performed.

According to aspects of the inventive concepts, there is provided an image sensor comprising a pixel array including a plurality of pixels, a readout circuit configured to generate a digital signal from a pixel signal received from the pixel array, and a signal processor configured to identify illuminance based on at least one of a first value of the digital signal corresponding to a first pixel group among a plurality of pixels and a second value corresponding to a second pixel group adjacent to the first pixel group among the plurality of pixels, and generate image data based on a first calculation in which the first value and the second value are provided as operands when the illuminance is equal to or less than a first threshold.

According to aspect of the inventive concepts, there is provided an operating method performed by an image sensor, the operating method comprising generating a digital signal from a pixel signal received from a pixel array including a plurality of pixels, determining whether to perform a binning on a first pixel group and a second pixel group among a plurality of pixels based on at least one of a first value of the digital signal corresponding to the first pixel group and a second value of the digital signal corresponding to the second pixel group adjacent to the first pixel group, and generating image data based on a first calculation in which the first value and the second value are provided as operands when the binning is determined to be performed.

BRIEF DESCRIPTION OF THE DRAWINGS

Example embodiments of the inventive concepts will be more clearly understood from the following detailed description taken in conjunction with the accompanying drawings in which.

DETAILED DESCRIPTION OF THE EMBODIMENTS

Figure 1:
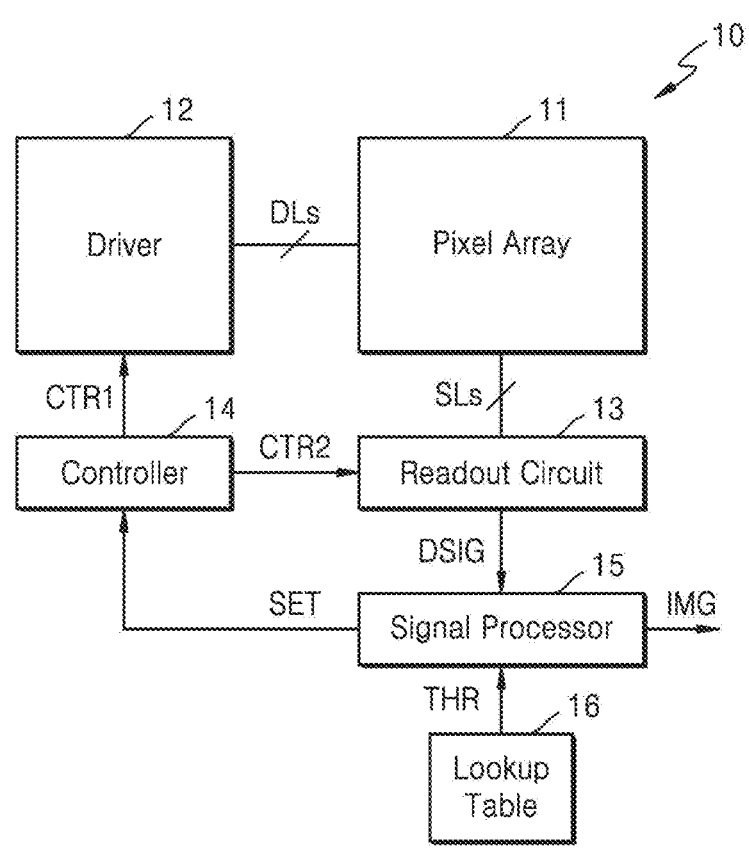
FIG. 1 is a block diagram illustrating an image sensor according to some example embodiments.

FIG. 1 is a block diagram illustrating an image sensor 10 according to some example embodiments. As shown in FIG. 1, the image sensor 10 may include a pixel array 11, a driver 12, a readout circuit 13, a controller 14, a signal processor 15, and a lookup table 16.

The image sensor 10 may be included in a system having a function for sensing an image or light. For example, the image sensor 10 may be included in an electronic device, such as a camera, a smartphone, a wearable device, an Internet of things (IoT), a tablet PC, a drone, an advanced drivers assistance system (ADAS), etc. In addition, the image sensor 10 may be included in components included in a vehicle, furniture, a manufacturing facility, a door, various measuring devices, and the like.

The pixel array 11 may include a plurality of pixels, and the plurality of pixels may be connected to a plurality of driving lines DLs and a plurality of sensing lines SLs. In some example embodiments, the image sensor 10 may be an active pixel sensor (APS), and each of a plurality of pixels of the pixel array 11 may include at least one photoelectric conversion device and at least one transistor. The photoelectric conversion device (or photoelectric conversion element) may detect light and generate an electrical signal corresponding to the light. As a non-limiting example, the photoelectric conversion device may include a photo-sensing device composed of an organic material or an inorganic material, such as an inorganic photo diode, an organic photo diode, a perovskite photo diode, a photo transistor, a photo gate, or a pinned photo diode. In some example embodiments, as described below with reference to FIGS. 2A and 2B, the pixel may provide two or more conversion gains. In some example embodiments, as described below with reference to FIG. 2B, the pixel may include two or more photoelectric conversion devices.

A microlens may be arranged on each of a plurality of pixels or on two or more pixels adjacent to each other. The pixel may detect light in a specific spectrum area from light received through the microlens. For example, the pixel array 11 may include a red pixel converting light in a red spectrum area into an electrical signal, a green pixel converting light in a green spectrum area into an electrical signal, and a blue pixel converting light in a blue spectrum area into an electrical signal. A color filter array may be arranged on a plurality of pixels, and a color that may be sensed by the pixel may be determined according to a color filter arranged on the pixel. One pixel may be formed in an image by combining pixel signals generated in each of the red pixel, the green pixel, and the blue pixel, and each of the red pixel, the green pixel, and the blue pixel may be referred to as a sub-pixel.

In some example embodiments, the pixel may have a multi-layer structure. The pixel of the multi-layer structure may include stacked photoelectric conversion devices, and the stacked photoelectric conversion devices may convert light in different spectrum areas into electrical signals, respectively. Accordingly, electrical signals corresponding to different colors may be output from one pixel. In addition, in some example embodiments, the pixel may include a photoelectric conversion device that converts the light of a specific spectrum area into an electrical signal according to an applied electrical signal.

The driver 12 may drive the pixel array 11 based on a first control signal CTR1 provided from the controller 14. For example, the driver 12 may generate a driving signal based on the first control signal CTR1, and may output a driving signal through a plurality of driving lines DLs. In some example embodiments, the driver 12 may drive a plurality of pixels of the pixel array 11 in units of a row, and may be referred to as a row driver. For example, the driver 12 may select a row based on the first control signal CTR1, and may drive pixels included in the row to output pixel signals through a plurality of sensing lines SLs.

The readout circuit 13 may receive pixel signals from the pixel array 11 through a plurality of sensing lines SLs. The readout circuit 13 may convert the pixel signal into a digital signal DSIG based on the second control signal CTR2 provided from the controller 14. In some example embodiments, the readout circuit 13 may include a ramp generator generating a ramp signal that increases or decreases at a constant slope, and may include an analog-to-digital converter (ADC) that converts a pixel signal into a digital signal DSIG based on the ramp signal. For example, the readout circuit 13 may include a plurality of ADCs that correspond to each of a plurality of sensing lines SLs and receive a ramp signal in common. In addition, in some example embodiments, the readout circuit 13 may generate a digital signal DSIG based on correlation double sampling.

The controller 14 may control the driver 12 through the first control signal CTR1, and may control the readout circuit 13 through the second control signal CTR2. The controller 14 may generate the first control signal CTR1 and the second control signal CTR2 based on a setting from the signal processor 15. For example, as shown in FIG. 1, the controller 14 may receive a set signal SET from the signal processor 15, and may generate a first control signal CTR1 and a second control signal CTR2 based on a setting corresponding to the set signal SET. In some example embodiments, controller 14 may include a register having a value set by the set signal SET, and controller 14 may control the driver 12 and/or the readout circuit 13 based on the value of the register. In some example embodiments, as described below with reference to FIG. 1, the controller 14 may identify an exposure integration time (EIT) and a pixel group including at least some of a plurality of pixels of the pixel array 11 based on the set signal SET. For example, the controller 14 may generate the first control signal CTR1 based on the identified pixel group and the EIT, and the driver 12 may output the driving signal through a plurality of driving lines DLs based on the first control signal CTR1 so that the identified pixel group has the identified EIT. Operations of the driver 12 and the readout circuit 13 may be switched according to timing of the first control signal CTR1 and the second control signal CTR2, and accordingly, the controller 14 may be referred to as a timing controller.

The signal processor 15 may receive the digital signal DSIG from the readout circuit 13 and may generate image data IMG representing an image of an object. In some example embodiments, the signal processor 15 may perform various compensation operations. For example, the signal processor 15 may perform noise reduction, gain adjustment, waveform shaping, interpolation, white balance adjustment, gamma processing, edge emphasis, binning, and the like.

The lookup table 16 may include at least one threshold THR, and may provide at least one threshold THR to the signal processor 15. As will be described below, the at least one threshold THR may be used to identify an area in which the signal processor 15 will perform binning. In some example embodiments, the lookup table 16 may include at least one threshold (THR) as well as at least one value (e.g., a weight) used for binning. The lookup table 16 may be stored in a storage accessible by the signal processor 15. For example, the lookup table 16 may be stored in a volatile memory device such as dynamic random access memory (DRAM), static random access memory (SRAM), etc., and/or a nonvolatile memory device such as flash memory, etc. In some example embodiments, the lookup table 16 may be stored in a register set.

In some example embodiments, the signal processor 15 may perform binning on pixels adjacent to each other. Binning may refer to a process of calculating values corresponding to a plurality of pixels in the image data IMG by processing a plurality of values of the digital signal DSIG corresponding to a plurality of pixels adjacent to each other and improving noise characteristics. For example, when signals and noise of the first pixel are $S_1$ and $N_1$, signals and noise of the second pixel adjacent to the first pixel are $S_2$ and $N_2$, signals of the first pixel and the second pixel have the same magnitude ($|S_1|=|S_2|$), noise of the first pixel and the second pixel has the same magnitude ($|N_1|=|N_2|$), as an example of binning, average of the first pixel and the second pixel may provide improvement of the SNR of about 3 dB as shown in [Equation 1].

$$\text{Average Signal:} \frac{S_1 + S_2}{2} = S_1 \qquad \text{[Equation 1]}$$

$$\text{Average Noise:} \frac{\sqrt{N_1^2 + N_2^2}}{2} = \frac{1}{\sqrt{2}} N_1$$

$$SNR_{binning} = 20\log\left(\sqrt{2}\frac{S_1}{N_1}\right) \cong 20\log\left(\frac{S_1}{N_1}\right) + 3 \text{ dB}$$

In some example embodiments, as described below with reference to FIG. 8A, values of the digital signal DSIG corresponding to pixels respectively included in adjacent rows may be processed, or values of the digital signal DSIG corresponding to pixels respectively included in adjacent columns may be processed as described below with reference to FIG. 8B. In some example embodiments, values of the digital signal DSIG corresponding to a plurality of pixels (e.g., 2×2) respectively included in rows and columns adjacent to each other may be also processed.

The noise characteristic, e.g., the signal-to-noise ratio (SNR), may be improved by binning, while the resolution or sharpness of the image may be degraded by binning. The sharpness of the image may be expressed as a modulation transfer function (MTF), and the MTF may mean the expressiveness of the frequency component in the image. In order to prevent or reduce deterioration of the MTF, the use of noise reduction techniques such as binning may be limited. Hereinafter, as described with reference to the drawings, the signal processor 15 may perform binning in an area requiring noise reduction in an image, and may not perform binning in other areas. Accordingly, the image indicated by the image data IMG may have good SNR and resolution at the same time. Hereinafter, binning will be mainly described as an example of the noise reduction technique, but it is noted that embodiments of the inventive concept are not limited thereto.

The signal processor 15 may have an arbitrary structure that performs the above-described operation. For example, the signal processor 15 may include at least one of a programmable component, such as a processing core, a reconfigurable component, such as a field programmable gate array (FPGA), and a component providing a fixed function, such as an intellectual property (IP) core.

Figure 2A:
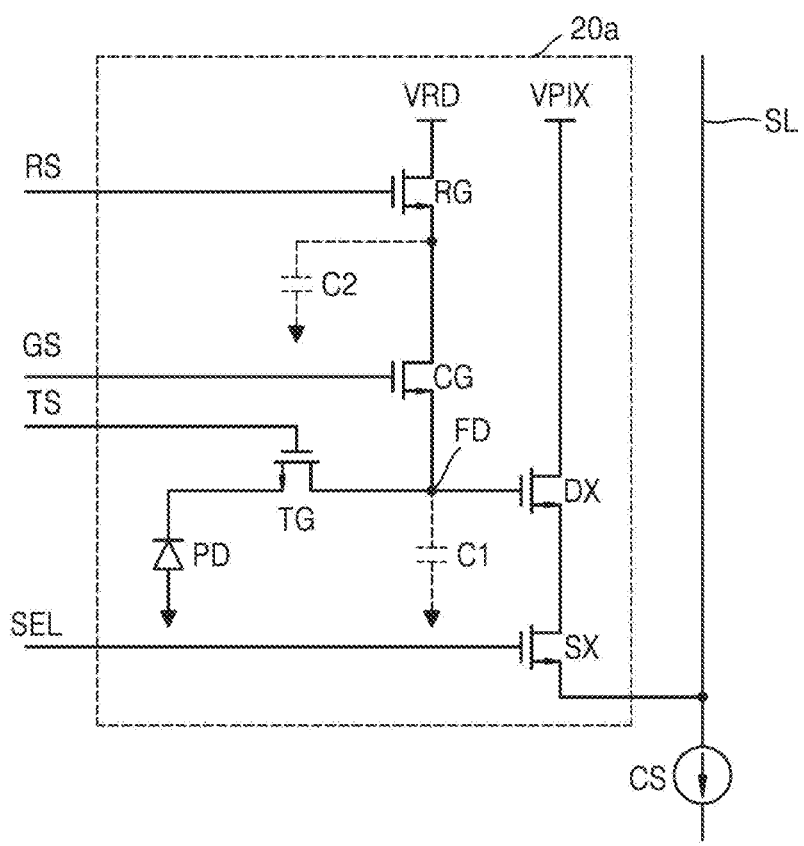
FIGS. 2A and 2B are circuit diagrams illustrating examples of pixels according to some example embodiments.
Figure 2B:
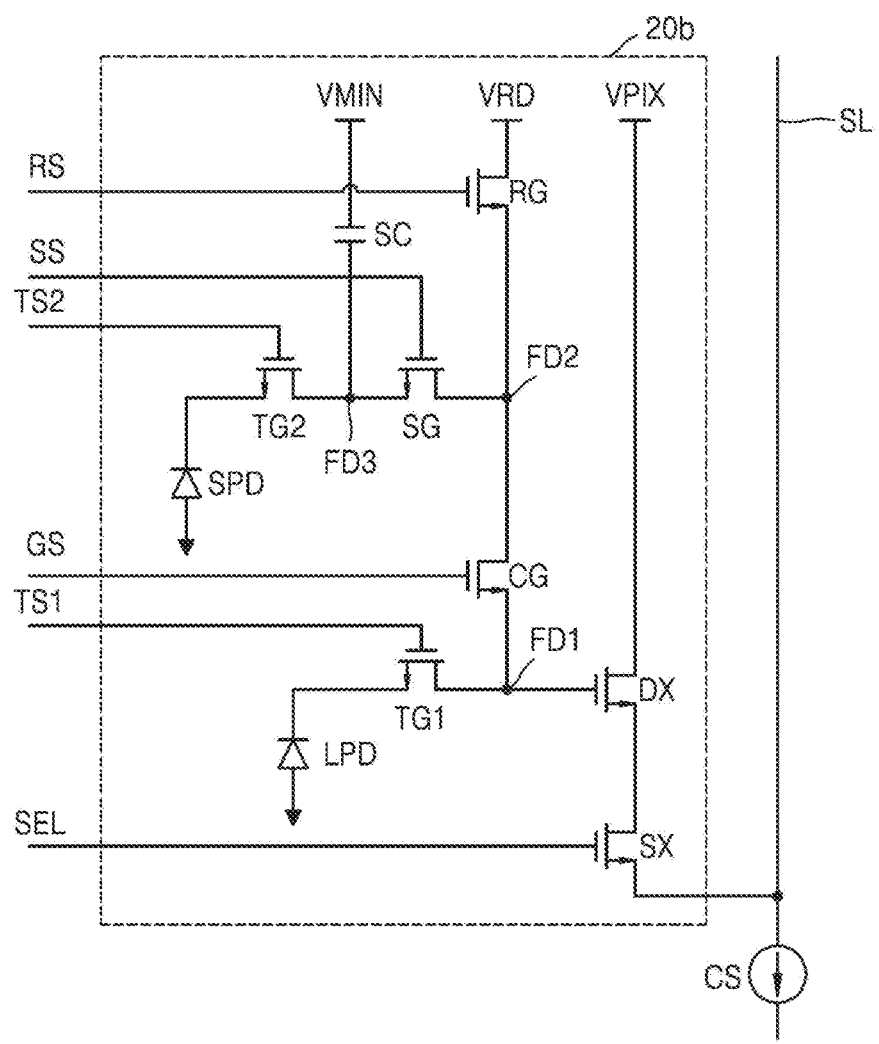

FIGS. 2A and 2B are circuit diagrams illustrating examples of pixels according to some example embodiments. In some example embodiments, each of the pixels 20a and 20b of FIGS. 2A and 2B may be included in the pixel array 11 of FIG. 1. It is noted that the pixels included in the pixel array 11 of FIG. 1 are not limited to the pixels 20a and 20b of FIGS. 2A and 2B. Hereinafter, redundant portions of the descriptions of FIGS. 2A and 2B will be omitted.

Referring to FIG. 2A, a pixel 20a may include a photodiode PD, a first capacitor C1, a second capacitor C2, and a plurality of transistors. The plurality of transistors may include a transfer transistor TG, a reset transistor RG, a gain control transistor CG, a driving transistor DX, and a selection transistor SX. In some example embodiments, the first capacitor C1 may correspond to a parasitic capacitor of the floating diffusion node FD. In some example embodiments, the second capacitor C2 may be a passive element structured to have a fixed or variable capacitance. In some example embodiments, the second capacitor C2 may correspond to a parasitic capacitor of a node connected to a source of the reset transistor RG and a drain of the gain control transistor CG.

The photodiode PD is a photoelectric conversion device and may convert light incident from the outside into an electrical signal. The photodiode PD may accumulate electric charges according to intensity of light. The pixel 20a may receive driving signals provided from the driver 12 of FIG. 1, e.g., a reset signal RS, a gain signal GS, a transfer signal TS, and a selection signal SEL.

The reset transistor RG may be turned on in response to the activated reset signal RS, and the gain control transistor CG may be turned on in response to the activated gain signal GS. Accordingly, the reset voltage VRD may be applied to the floating diffusion node FD, and the floating diffusion node FD may be reset. The transfer transistor TG may be turned on in response to the activated transfer signal TS, and accordingly, the photodiode PD may also be reset.

The transfer transistor TG may be turned off in response to the deactivated transfer signal TS, and while the transfer transistor TG is turned off, that is, during the exposure integration time, the photodiode PD may accumulate charges according to the incident light. When the transfer transistor TG is turned on in response to the activated transfer signal TS, charges accumulated in the photodiode PD may be transferred to the floating diffusion node FD. When the gain signal GS is deactivated, the charges may be accumulated in the first capacitor C1, while when the gain signal GS is activated, the charges may be accumulated in the first capacitor C1 and the second capacitor C2.

The voltage of the floating diffusion node FD may depend on the charges accumulated in the photodiode PD and may be expressed as a product of the charges accumulated in the photodiode PD and the conversion gain. As described above, a voltage of the floating diffusion node FD corresponding to the same amount of charges may vary depending on whether the gain signal GS is activated, and a conversion gain may vary according to the gain signal GS. That is, when the gain signal GS is deactivated, the pixel 20a may have a high conversion gain (HCG), while when the gain signal GS is activated, the pixel 20a may have a relatively low conversion gain (LCG). As described above, the pixel 20a providing two different conversion gains may be referred to as a dual conversion gain (DCG) pixel. Herein, a state where the gain signal GS is deactivated may be referred to as an HCG mode, and a state where the gain signal GS is activated may be referred to as an LCG mode. As described later with reference to FIG. 3, the DCG pixel may extend the dynamic range of the image sensor 10.

The driving transistor DX may function as a source follower by a pixel voltage VPIX and a current source CS connected to a sensing line SL, and may transfer a voltage of the floating diffusion node FD to the selection transistor SX. In some example embodiments, the current source CS may be shared by pixels connected to the sensing line SL and may be included in the readout circuit 13 of FIG. 1. The selection transistor SX may provide an output voltage of the driving transistor DX to the sensing line SL in response to the activated selection signal SEL. The voltage of the sensing line SL may be provided to the readout circuit 13 of FIG. 1 as a pixel signal, and the readout circuit 13 may generate a digital signal DSIG corresponding to the voltage of the sensing line SL.

Referring to FIG. 2B, the pixel 20b may include a large photo diode LPD, a small photo diode SPD, a capacitor SC, and a plurality of transistors. The plurality of transistors may include a first transfer transistor TG1, a second transfer transistor TG2, a switch transistor SG, a reset transistor RG, a gain control transistor CG, a driving transistor DX, and a selection transistor SX. Each of the first to third floating diffusion nodes FD1 to FD3 may have parasitic capacitance. In some example embodiments, the pixel 20b may further include capacitors as passive elements respectively connected to the first to third floating diffusion nodes FD1 to FD3.

The large photodiode LPD and the small photodiode SPD may accumulate electric charges according to incident light. The large photodiode LPD may have a size larger than the small photodiode SPD, the large photodiode LPD may be suitable for a low illuminance object, and the small photodiode SPD may be suitable for a high intensity-of-illumination object. Like the pixel 20b, a pixel structure including photodiodes having different sizes may be referred to as a split photodiode, and in particular, a structure in which the small photodiode SPD is arranged at one corner of the large photodiode LPD may be referred to as a corner pixel.

The pixel 20b may receive driving signals provided from the driver 12 of FIG. 1, e.g., a reset signal RS, a gain signal GS, a first transfer signal TS1, a second transfer signal TS2, a switch signal SS, and a selection signal SEL. The pixel 20b may support the HCG mode and the LCG mode of the large photodiode LPD, and may support the HCG mode and the LCG mode of the small photodiode SPD. Accordingly, the pixel 20b may provide a wider dynamic range than the pixel 20a of FIG. 2A.

The reset transistor RG may be turned on in response to the activated reset signal RS, and accordingly, the second floating diffusion node FD2 may be reset. The gain control transistor CG may be turned on in response to the activated gain signal GS, and accordingly, the first floating diffusion node FD1 may be reset. In addition, the switch transistor SG may be turned on in response to the activated switch signal SS, and accordingly, the third floating diffusion node FD3 may be reset.

In the HCG mode of the large photodiode LPD, the gain signal GS may be deactivated, and accordingly, the gain control transistor CG may be turned off. When the first transfer transistor TG1 is turned on in response to the activated first transfer signal TS1, the charges accumulated in the large photodiode LPD may be transferred to the first floating diffusion node FD1. In the LCG mode of the large photodiode LPD, the gain signal GS may be activated, and accordingly, the gain control transistor CG may be turned on. When the first transfer transistor TG1 is turned on in response to the activated first transfer signal TS1, the charges accumulated in the large photodiode LPD may be transferred to the first floating diffusion node FD1 and the second floating diffusion node FD2.

In the HCG mode of the small photodiode SPD, the switch signal SS may be deactivated, and accordingly, the switch transistor SG may be turned off. When the second transfer transistor TG2 is turned on in response to the activated second transfer signal TS2, the charges accumulated in the small photodiode SPD may be transmitted to the third floating diffusion node FD3 to which the capacitor SC is connected. As shown in FIG. 2B, the capacitor SC may be connected between the node having the voltage VMIN applied thereto and the third floating diffusion node FD3. In the LCG mode of the small photodiode SPD, the switch signal SS may be activated, and accordingly, the switch transistor SG may be turned on. When the second transfer transistor TG2 is turned on in response to the activated second transfer signal TS2, the charges accumulated in the small photodiode SPD may be transferred to the third floating diffusion node FD3 and the second floating diffusion node FD2.

In some example embodiments, the pixel may be set in different modes under the control of driver 12, and may output pixel signals corresponding to different modes, respectively. For example, the pixel 20a of FIG. 2A may output a pixel signal corresponding to charges accumulated in the photodiode PD based on a high conversion gain (HCG) in the HCG mode, and may output a pixel signal corresponding to charges accumulated in the photodiode PD based on a low conversion gain (LCG) in the LCG mode. In addition, the pixel 20b of FIG. 2B may output a pixel signal corresponding to the charges accumulated in the LPD based on a high conversion gain (HCG) in a first mode, output a pixel signal corresponding to the charges accumulated in the LPD based on a low conversion gain (LCG) in a second mode, output a pixel signal corresponding to the charges accumulated in the SPD based on a high conversion gain (HCG) in a third mode, and output a pixel signal corresponding to the charges accumulated in the SPD based on a low conversion gain (LCG) in a fourth mode.

Figure 3:
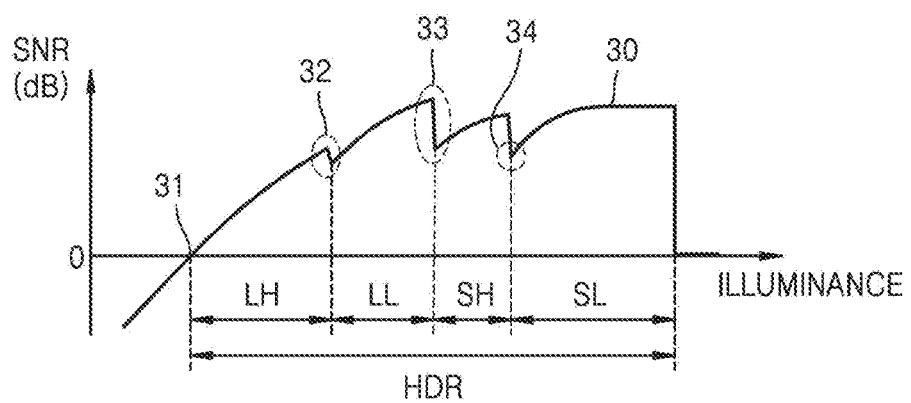
FIG. 3 is a relationship of a signal-to-noise ratio (SNR) to a high-dynamic range (HDR) graph of an image sensor according to some example embodiments.

FIG. 3 is a relationship of a signal-to-noise ratio (SNR) to a high-dynamic range (HDR) graph of an image sensor 10 according to some example embodiments. In the graph of FIG. 3, the horizontal axis represents the intensity of light incident on the image sensor 10, that is, the illuminance, and the vertical axis represents the signal-to-noise ratio SNR. Hereinafter, FIG. 3 will be described with reference to FIG. 1.

In some example embodiments, the curve 30 in the graph of FIG. 3 shows the characteristics of the image sensor 10 including pixels including photodiodes having different sizes and supporting the dual conversion gain DCG, as shown in the pixel 20b of FIG. 2B. Accordingly, the image sensor 10 may provide a wide dynamic range, that is, a high dynamic range (HDR). For example, as shown in FIG. 3, the HDR may be defined as a range in which the curve 30 has an SNR higher than zero, and may include an LH section, an LL section, an SH section, and an SL section according to the illuminance.

The pixel may output pixel signals corresponding to a plurality of modes, as described above with reference to FIGS. 2A and 2B. The signal processor 15 may select a mode according to the illuminance section, and may use a pixel signal corresponding to the selected mode. For example, the signal processor 15 may use a pixel signal output by the pixel in the first mode in the LH section, a pixel signal output by the pixel in the second mode in the LL section, a pixel signal output by the pixel in the third mode in the SH section, and a pixel signal output by the pixel in the fourth mode in the SL section. Accordingly, as illustrated in FIG. 3, HDR may be achieved, and the image sensor 10 may have a wide dynamic range. The signal processor 15 may combine different illuminance sections in the image, that is, areas corresponding to different modes.

The image sensor 10 may be required to simultaneously satisfy various performances. For example, as illustrated in FIG. 3, the image sensor 10 may be required to provide a good low illuminance SNR 31, good SNRs 32, 33, and 34 at an image coupling point, and an extended HDR. As described above with reference to FIG. 1, when a technique (for example, binning) for increasing SNR is used, the sharpness of an image may be degraded, and thus the image sensor 10, that is, the signal processor 15, may selectively perform binning. For example, the signal processor 15 may identify, based on illuminance, a range in which an increase in SNR is required, and may perform binning only in the identified range. Accordingly, both noise characteristics and sharpness in the image may be improved. Examples of ranges in which binning is performed will be described later with reference to FIG. 4.

Figure 4:
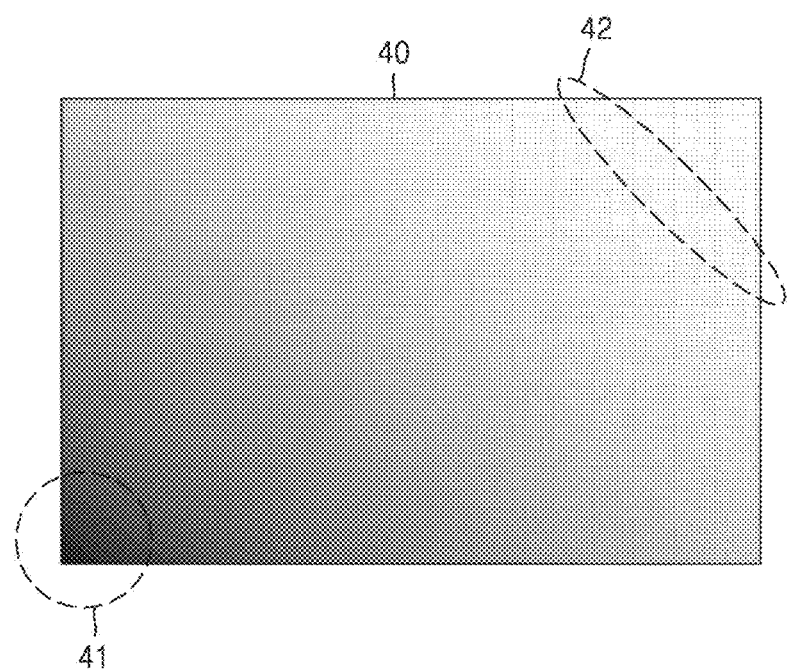
FIG. 4 is a block diagram illustrating an image according to some example embodiments.

FIG. 4 is a block diagram illustrating an image 40 according to some example embodiments. The image 40 of FIG. 4 may be defined by the image data IMG of FIG. 1, and as shown in FIG. 4, the illuminance may increase from the image 40 toward the upper-right. Hereinafter, FIG. 4 will be described with reference to FIG. 1.

As described above with reference to the drawings, the signal processor 15 of FIG. 1 may perform binning in some areas of the image 40. For example, the signal processor 15 may perform binning in an area having a very low illuminance, such as the first area 41, and accordingly, noise characteristics, that is, SNR of the first area 41 may be improved. The area having the very low illuminance, such as the first area 41, may require improvement of SNR rather than a MTF, and accordingly, the signal processor 15 may perform an operation for improving SNR, for example, binning. In addition, the signal processor 15 may perform binning in an area including a boundary between areas corresponding to different illuminance sections, such as the second area 42. As described above with reference to FIG. 3, degradation of SNR may occur at boundaries between different illuminance sections (for example, 32, 33, and 34 of FIG. 3). Accordingly, the signal processor 15 may improve SNR by performing binning in the second area 42.

Figure 5:
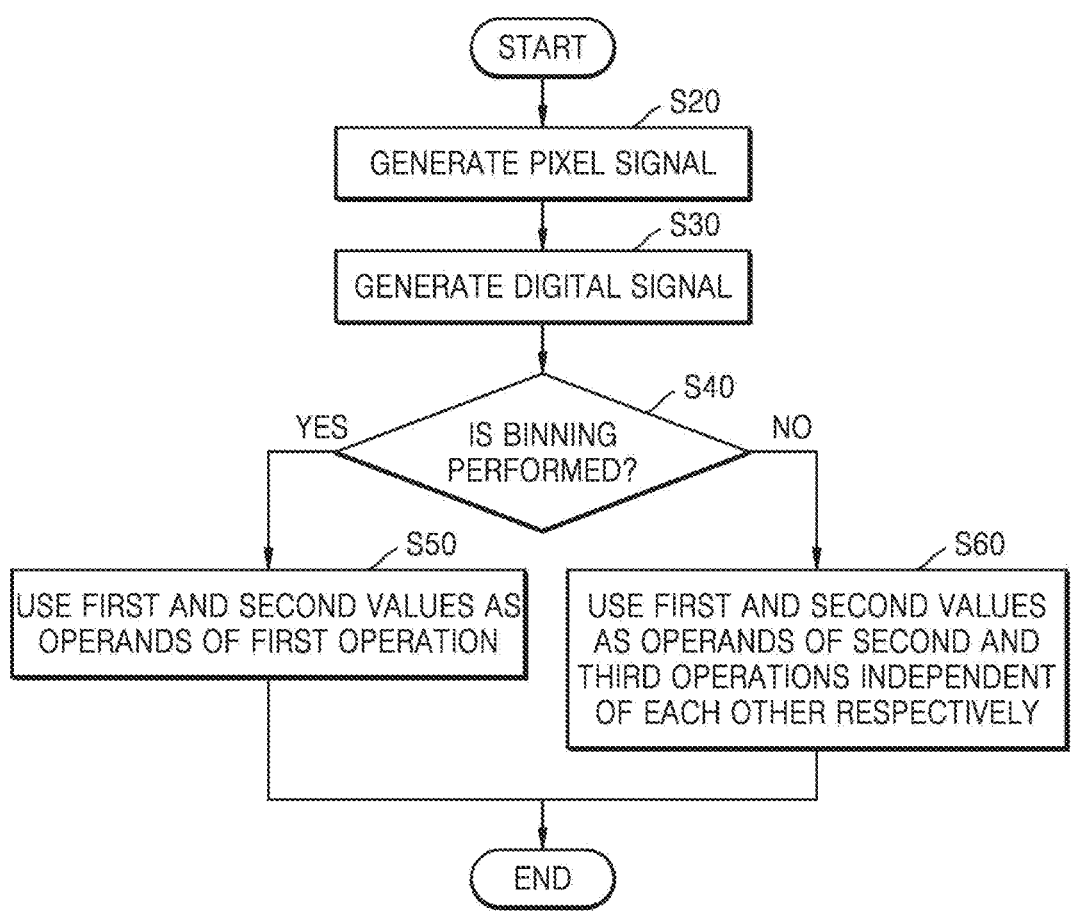
FIG. 5 is a flowchart illustrating an operating method of an image sensor according to some example embodiments.

FIG. 5 is a flowchart illustrating a method performed by an image sensor 10 according to some example embodiments. Herein, the method of FIG. 5 may be referred to as a method of sensing images. As shown in FIG. 5, the method performed by the image sensor 10 may include a plurality of operations $S_{20}$ to $S_{60}$. Hereinafter, FIG. 5 will be described with reference to FIG. 1.

Referring to FIG. 5, a pixel signal may be generated in operation S20. For example, the pixel array 11 may sense light based on driving signals provided by the driver 12 through a plurality of driving lines DLs, and may output pixel signals through a plurality of sensing lines SLs. As described above with reference to FIGS. 2A and 2B, the pixel array 11 may output pixel signals corresponding to different modes under the control of the driver 12.

In operation S30, the digital signal DSIG may be generated. For example, in step S30, the readout circuit 13 may generate digital signal DSIG from the pixel signals received from the pixel array 11 through the plurality of sensing lines SLs. In some example embodiments, the readout circuit 13 may generate a digital signal DSIG from the pixel signal based on the correlated double sampling CDS.

In operation S40, it may be determined whether to perform a binning. For example, the pixel array 11 may include a first pixel group including at least one pixel and a second pixel group including at least one pixel adjacent to the first pixel group. The signal processor 15 may determine whether to perform the binning on the first pixel group and the second pixel group based on at least one of a first value of the digital signal DSIG corresponding to the first pixel group and a second value of the digital signal DSIG corresponding to the second pixel group. As illustrated in FIG. 5, operation S50 may be subsequently performed when the binning is determined to be performed, while operation S60 may be subsequently performed when the binning is determined to be omitted. Examples of operation S40 will be described later with reference to FIGS. 6 and 17.

When the binning is determined to be performed, the first value and the second value may be used as operands of the first operation in operation S50. For example, the signal processor 15 may generate image data IMG based on a first operation having a first value corresponding to the first pixel group and a second value corresponding to the second pixel group as operands. In some example embodiments, the first operation may include a weighted sum of the first value and the second value. Accordingly, at least one pixel corresponding to the first pixel group and at least one pixel corresponding to the second pixel group in the image data IMG may have values based on the result of the first operation, respectively. An example of operation S50 will be described later with reference to FIG. 9.

When the binning is determined not to be performed, the first value and the second value may be used in operation S60 as operands of the second operation and the third operation that are independent of each other, respectively. For example, the signal processor 15 may calculate a value of at least one pixel corresponding to the first pixel group in the image data IMG based on the second operation having the first value as an operand. In addition, the signal processor 15 may calculate the at least one pixel value corresponding to the second pixel group in the image data IMG based on the third operation having the second value as an operand. As a result, the value of the at least one pixel corresponding to the first pixel group and the value of the at least one pixel corresponding to the second pixel group may be calculated in the image data IMG independently of each other, and MTF may not be degraded.

Figure 6:
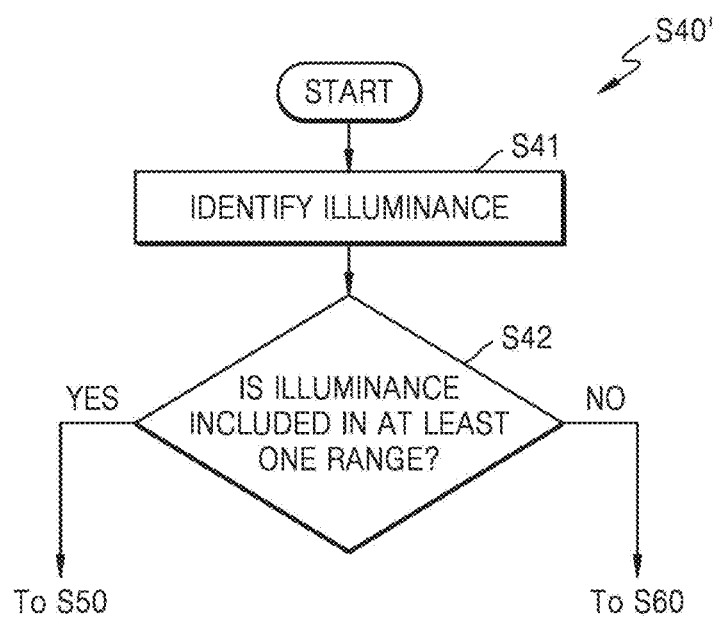
FIG. 6 is a flowchart illustrating an operating method of an image sensor according to some example embodiments.

FIG. 6 is a flowchart illustrating a method performed by an image sensor 10 according to some example embodiments. Specifically, the flowchart of FIG. 6 illustrates an example of operation S40 of FIG. 5. As described above with reference to FIG. 5, it may be determined whether to perform a binning in operation S40' of FIG. 6. As shown in FIG. 6, operation S40' may include operations S41 and S42. Hereinafter, FIG. 6 will be described with reference to FIG. 1.

Referring to FIG. 6, illuminance may be identified in operation S41. For example, the signal processor 15 may identify the illuminance of a pixel or an area including at least one pixel based on a value of the digital signal DSIG. In some example embodiments, the signal processor 15 may identify the illuminance based on the value of the image data IMG, and in this case, the identified illuminance may correspond to a previous frame of a frame corresponding to the digital signal DSIG currently output from the readout circuit 13. In some example embodiments, when operation S11 of FIG. 10, which will be described later, is performed before operation S20 of FIG. 5, the execution of operation S41 may be omitted.

In operation S42, it may be determined whether the illuminance is included in at least one range. For example, the signal processor 15 may determine whether the illuminance identified in operation S41 is included in at least one range. The at least one range may include predefined ranges or desired ranges, however the inventive concepts are not limited thereto, and the at least one range may be, for example, dynamic, or set by a user. The at least one range may be referred to as the at least one illumination range. For example, the at least one range may be defined by at least one threshold THR provided from the lookup table 16, and the signal processor 15 may compare the illuminance identified in operation S41 with the at least one threshold THR. The at least one range defined by the at least one threshold THR may indicate a range of illuminance in which binning is performed. Accordingly, as shown in FIG. 6, when the illuminance is included in the at least one range, that is, when a binning is determined to be performed, operation S50 of FIG. 5 may be subsequently performed. Meanwhile, as shown in FIG. 6, when the illuminance is not included in the at least one range, that is, when a binning is determined not to be performed, operation S60 of FIG. 5 may be subsequently performed.

Figure 7A:
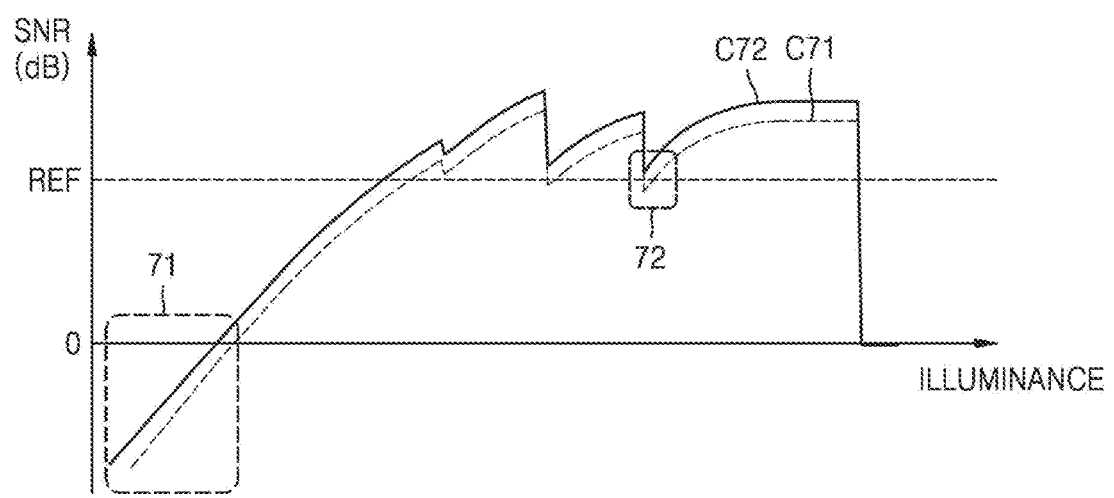
FIGS. 7A and 7B are SNR-to-HDR graphs of an image sensor according to some example embodiments.
Figure 7B:
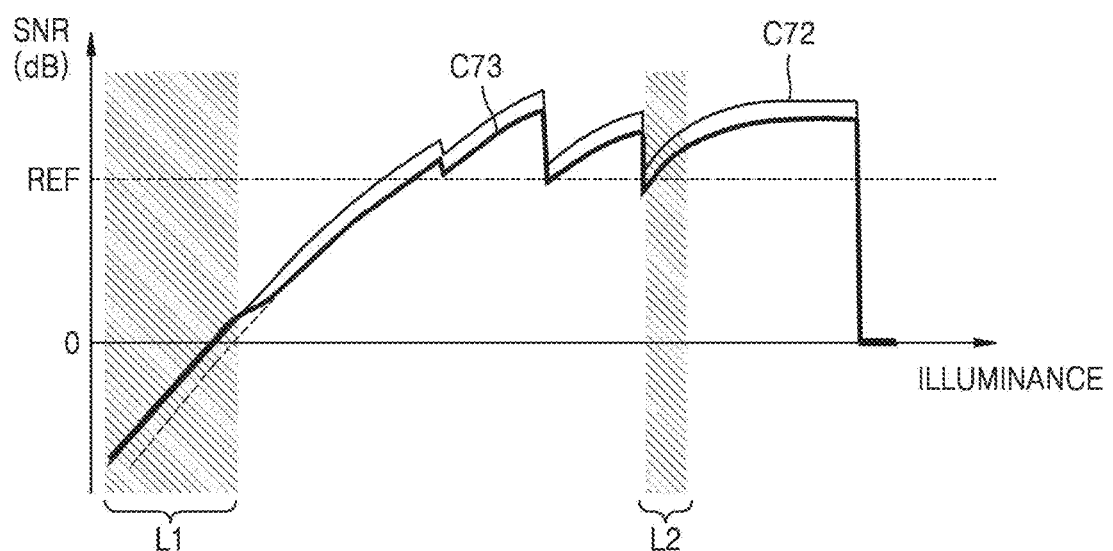

FIGS. 7A and 7B are SNR-to-HDR graphs of an image sensor 10 according to some example embodiments. Hereinafter, FIGS. 7A and 7B will be described with reference to FIG. 1.

Referring to FIG. 7A, the first curve C71 indicates a case in which a binning is not performed in the entire illuminance, and the second curve C72 indicates a case in which the binning is performed at the entire illuminance. As described above with reference to the drawings, noise characteristics may be improved by binning, and accordingly, the second curve C72 may exhibit an SNR higher than the first curve C71 in the overall illuminance. However, binning may cause degradation of MTF, and accordingly, binning may be performed in some ranges of the total illuminance. For example, the first area 71 may correspond to a very low illuminance, and at the very low illuminance, improvement of SNR may be required over MTF. In addition, the image may be required to have an SNR (e.g., 26 dB) equal to or greater than a reference value REF in the illuminance excluding a low illuminance, and in the second area 72, the first curve C71 may have an SNR less than the reference value REF. Accordingly, improvement of SNR may be required over MTF in the second area 72.

Referring to FIG. 7B, the signal processor 15 may perform binning for increasing SNR in the first area 71 and the second area 72 of FIG. 7A, and accordingly, the image sensor 10 may have SNR-HDR characteristics such as a third curve C73. As shown in FIG. 7B, in a first illuminance range L1 corresponding to the first area 71, the third curve C73 may overlap the second curve C72 corresponding to the binning, and the third curve C73 may overlap the second curve C72 corresponding to the binning in a second illuminance range L2 corresponding to the second area 72. Accordingly, SNR may be improved at a very low illuminance, and SNR equal to or greater than the reference value REF may be achieved at an illuminance range other than the low illuminance. In addition, in the illuminance excluding the first illuminance range L1 and the second illuminance range L2, the third curve C73 may overlap the first curve C71, thereby preventing or reducing degradation of the MTF.

The at least one threshold THR may define a first illuminance range L1 and a second illuminance range L2. For example, the first illuminance range L1 may be defined as an illuminance range equal to or less than a first threshold value, and at least one threshold value THR may include a first threshold value. In addition, the second illuminance range L2 may be defined as an illuminance range between the second threshold value and the third threshold value, and at least one threshold value THR may include a second threshold value and a third threshold value.

Figure 8A:
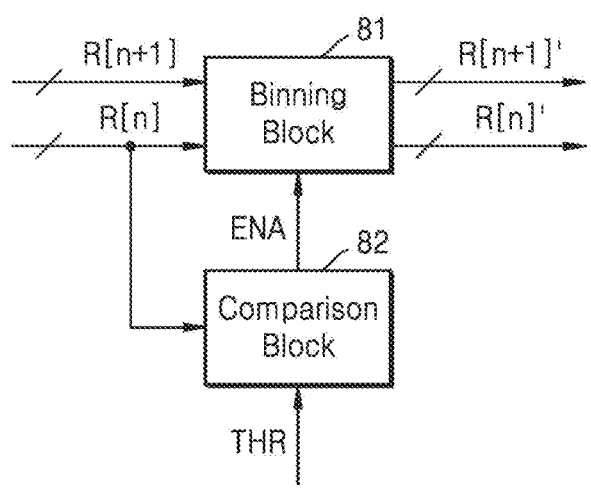
FIGS. 8A and 8B are block diagrams illustrating examples of operations of a signal processor according to some example embodiments.
Figure 8B:
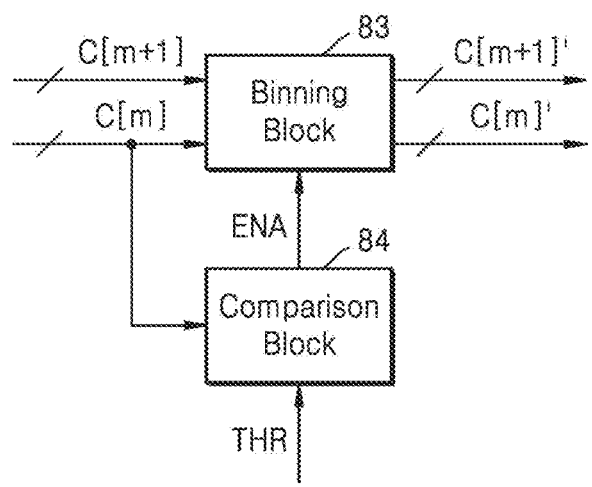

FIGS. 8A and 8B are block diagrams illustrating examples of operations of a signal processor 15 according to some example embodiments. Specifically, the block diagrams of FIGS. 8A and 8B illustrate examples of a data path in the signal processor 15. In FIGS. 8A and 8B, one block may include a software block executed by a programmable component and/or a hardware block. As described above with reference to FIG. 5, the signal processor 15 may determine whether to perform a binning based on values of the digital signal DSIG corresponding to the first pixel group and the second pixel group, respectively. Hereinafter, FIGS. 8A and 8B will be described with reference to FIG. 1.

Referring to FIG. 8A, the signal processor 15 may perform binning on rows adjacent to each other of the pixel array 11. That is, the first pixel group and the second pixel group may include rows adjacent to each other of the pixel array 11, respectively. As illustrated in FIG. 8A, the binning block 81 may selectively perform binning on the $n^{th}$ row and the $(n+1)$th row (n is an integer greater than zero). For example, the binning block 81 may receive a value R [n] corresponding to the $k^{th}$ pixel of the $n^{th}$ row and a value R [n+1] corresponding to the $k^{th}$ pixel of the $(n+1)^{th}$ row (k is an integer greater than zero). The binning block 81 may generate a value R [n]' corresponding to the $k^{th}$ pixel of the $n^{th}$ row and a value R [n+1]' corresponding to the $k^{th}$ pixel of the $(n+1)^{th}$ row by performing binning in response to the activated enable signal ENA. Meanwhile, the binning block 81 may not perform binning in response to the deactivated enable signal ENA, and the value R [n]' corresponding to the $k^{th}$ pixel of the $n^{th}$ row and a value and the value R [n+1]' corresponding to the $k^{th}$ pixel of the $(n+1)^{th}$ row may be equal to the input values R [n] and R [n+1], respectively (R [n]=R [n]' and R [n+1]=R [n+1]').

A comparison block 82 may compare a value corresponding to a pixel included in one row with at least one threshold THR. For example, as illustrated in FIG. 8A, the comparison block 82 may receive a value R [n] corresponding to the $k^{th}$ pixel of the $n^{th}$ row, and may compare the value R [n] with at least one threshold THR. When the value R [n] is included in at least one range defined by at least one threshold THR, the comparison block 82 may output the activated enable signal ENA. Meanwhile, when the value R [n] is not included in at least one range defined by the at least one threshold THR, the comparison block 82 may output the deactivated enable signal ENA.

Referring to FIG. 8B, the signal processor 15 may perform binning on columns adjacent to each other of the pixel array 11. That is, the first pixel group and the second pixel group may include columns adjacent to each other of the pixel array 11, respectively. As illustrated in FIG. 8B, the binning block 83 may selectively perform binning on the $m^{th}$ column and the $(m+1)^{th}$ column (m is an integer greater than zero). For example, the binning block 83 may receive a value C [m] corresponding to the $k^{th}$ pixel of the $m^{th}$ column and a value C [m+1] corresponding to the $k^{th}$ pixel of the $(m+1)^{th}$ column (k is an integer greater than zero). The binning block 83 may generate a value C [m]' corresponding to the $k^{th}$ pixel of the $m^{th}$ column and a value C [m+1]' corresponding to the $k^{th}$ pixel of the $(m+1)^{th}$ column by performing binning in response to the activated enable signal ENA. Meanwhile, the binning block 83 may not perform binning in response to the deactivated enable signal ENA, and the value C [m]' corresponding to the $k^{th}$ pixel of the $m^{th}$ column and a value and the value C [m+1]' corresponding to the $k^{th}$ pixel of the $(m+1)^{th}$ column may be equal to the input values C [m] and C [m+1], respectively (C [m]=C [m]' and C [m+1]=C [m+1]').

A comparison block 84 may compare a value corresponding to a pixel included in one column with at least one threshold THR. For example, as illustrated in FIG. 8B, the comparison block 84 may receive a value C [m] corresponding to the k$^{th}$ pixel of the m$^{th}$ column, and may compare the value C [m] with at least one threshold THR. When the value C [m] is included in at least one range defined by at least one threshold THR, the comparison block 84 may output the activated enable signal ENA. Meanwhile, when the value C [m] is not included in at least one range defined by the at least one threshold THR, the comparison block 84 may output the deactivated enable signal ENA.

Figure 9:
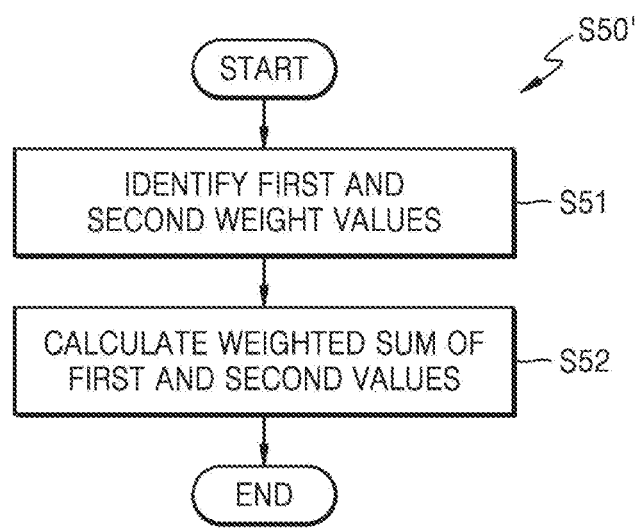
FIG. 9 is a flowchart illustrating an operating method of an image sensor according to some example embodiments.

FIG. 9 is a flowchart illustrating a method performed by an image sensor 10 according to some example embodiments. Specifically, the flowchart of FIG. 9 illustrates an example of operation S50 of FIG. 5. As described above with reference to FIG. 5, in operation S50' of FIG. 9, the first value and the second value may be used as operands of the first operation. As shown in FIG. 9, step S50' may include operations S51 and S52. Hereinafter, FIG. 9 will be described with reference to FIG. 1.

Referring to FIG. 9, in operation S51, a first weight and a second weight may be identified. For example, as described above with reference to FIG. 6, the illuminance may be identified, and a first weight and a second weight corresponding to the identified illuminance may be identified. In some example embodiments, the signal processor 15 may receive the first weight and the second weight from the lookup table 16. The first weight and the second weight may be used to calculate the weighted sum, as described below.

In operation S52, a weighted sum of the first value and the second value may be calculated. For example, the signal processor 15 may calculate a weighted sum of the first value and the second value based on the first weight and the second weight identified in operation S51. That is, the signal processor 15 may sum the product of the first weight and the first value and the product of the second weight and the second value. The first operation of FIG. 5 may include a weighted sum of the first value and the second value.

Figure 10:
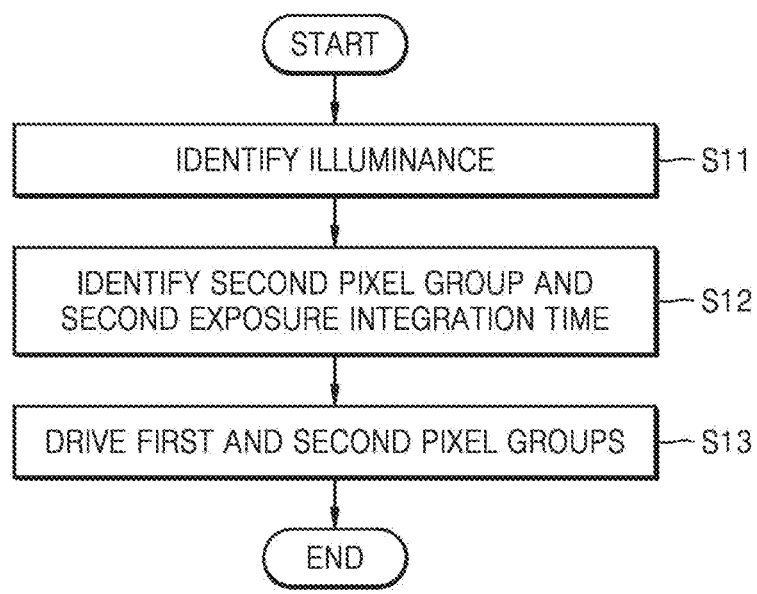
FIG. 10 is a flowchart illustrating an operating method of an image sensor according to some example embodiments.

FIG. 10 is a flowchart illustrating a method performed by an image sensor 10 according to some example embodiments. As shown in FIG. 10, the method performed by the image sensor 10 may include a plurality of operations S11, S12, and S13. In some example embodiments, the method of FIG. 10 may be performed prior to operation S20 of FIG. 5. Hereinafter, FIG. 10 will be described with reference to FIG. 1.

Referring to FIG. 10, illuminance may be identified. For example, the signal processor 15 may identify the illuminance of a pixel or an area including at least one pixel based on a value of the digital signal DSIG. In some example embodiments, the signal processor 15 may identify the illuminance based on the value of the image data IMG, and in this case, the identified illuminance may correspond to a previous frame of a frame corresponding to the digital signal DSIG currently output from the readout circuit 13.

In operation S12, the second pixel group and the second exposure integration time may be identified. For example, the signal processor 15 may compare the illuminance identified in operation S11 with at least one threshold value. The signal processor 15 may define, as one area, pixels included in the same illuminance range among two or more illuminance ranges defined by at least one threshold. The signal processor 15 may divide the pixel array 11 into two or more areas, and may identify a second pixel group including at least one pixel in the divided areas. In addition, the signal processor 15 may identify an exposure integration time corresponding to the identified illuminance. In some example embodiments, the lookup table 16 of FIG. 16 may include at least one threshold and an exposure integration time.

In operation S13, the first pixel group and the second pixel group may be driven. For example, the driver 12 may drive the pixel array 11 such that the first pixel group has a first exposure integration time and the second pixel group has a second integration exposure integration time. In operation S13, the first pixel group and the first exposure integration time may be independent of illuminance, unlike the second pixel group and the second exposure integration time identified based on illuminance. In some example embodiments, the first pixel group and the first exposure integration time may be fixed. The signal processor 15 may set the controller 14 through the set signal SET, and the controller 14 may control the driver 12 such that the first pixel group has a first exposure integration time and the second pixel group has a second exposure integration time. As described above with reference to FIG. 5 and the like, the binning is determined whether to be performed on the first pixel group having the first exposure integration time and the second pixel group having the second exposure integration time.

Figure 11A:
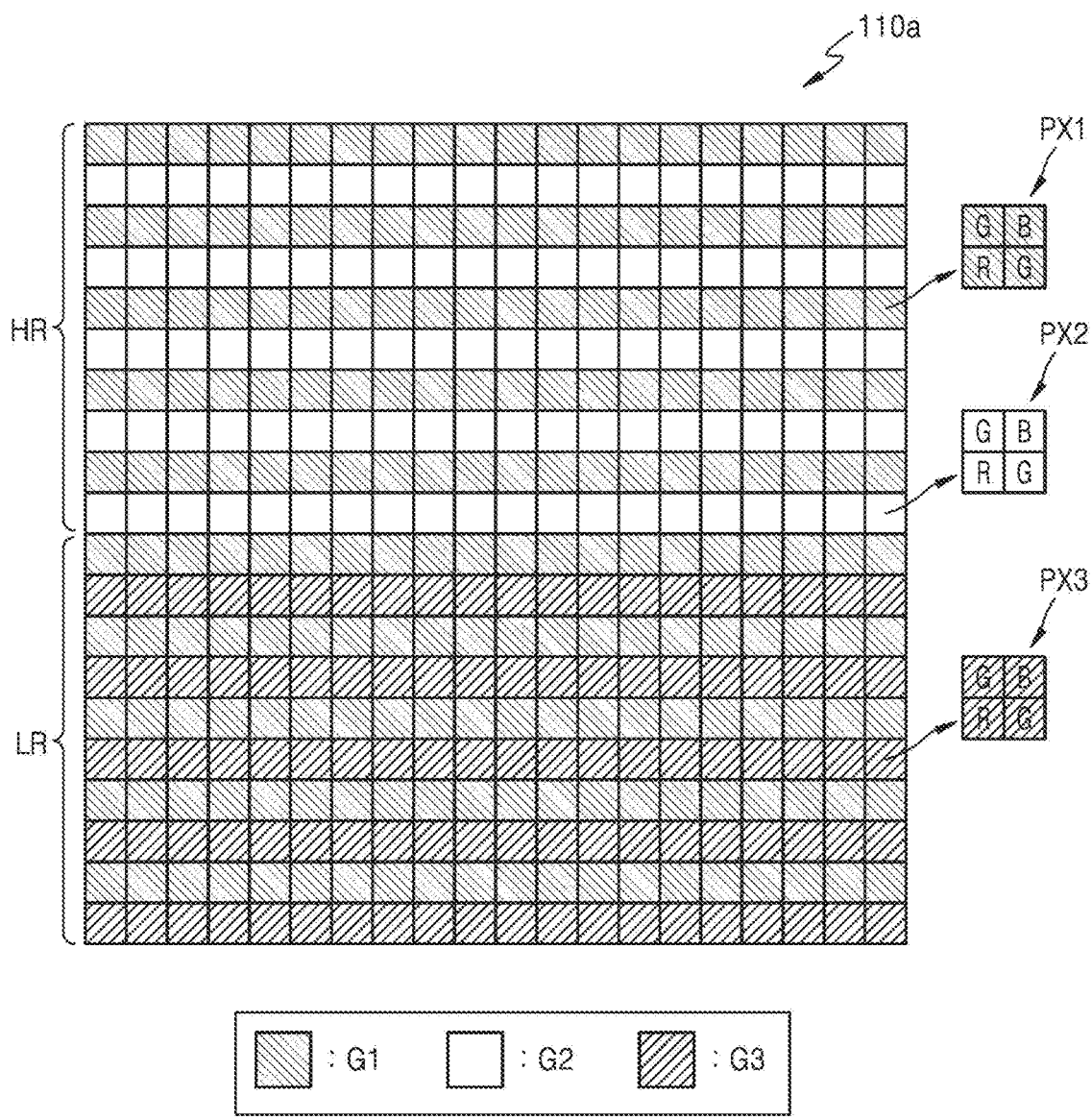
FIGS. 11A and 11B illustrate examples of pixel arrays according to some example embodiments.
Figure 11B:
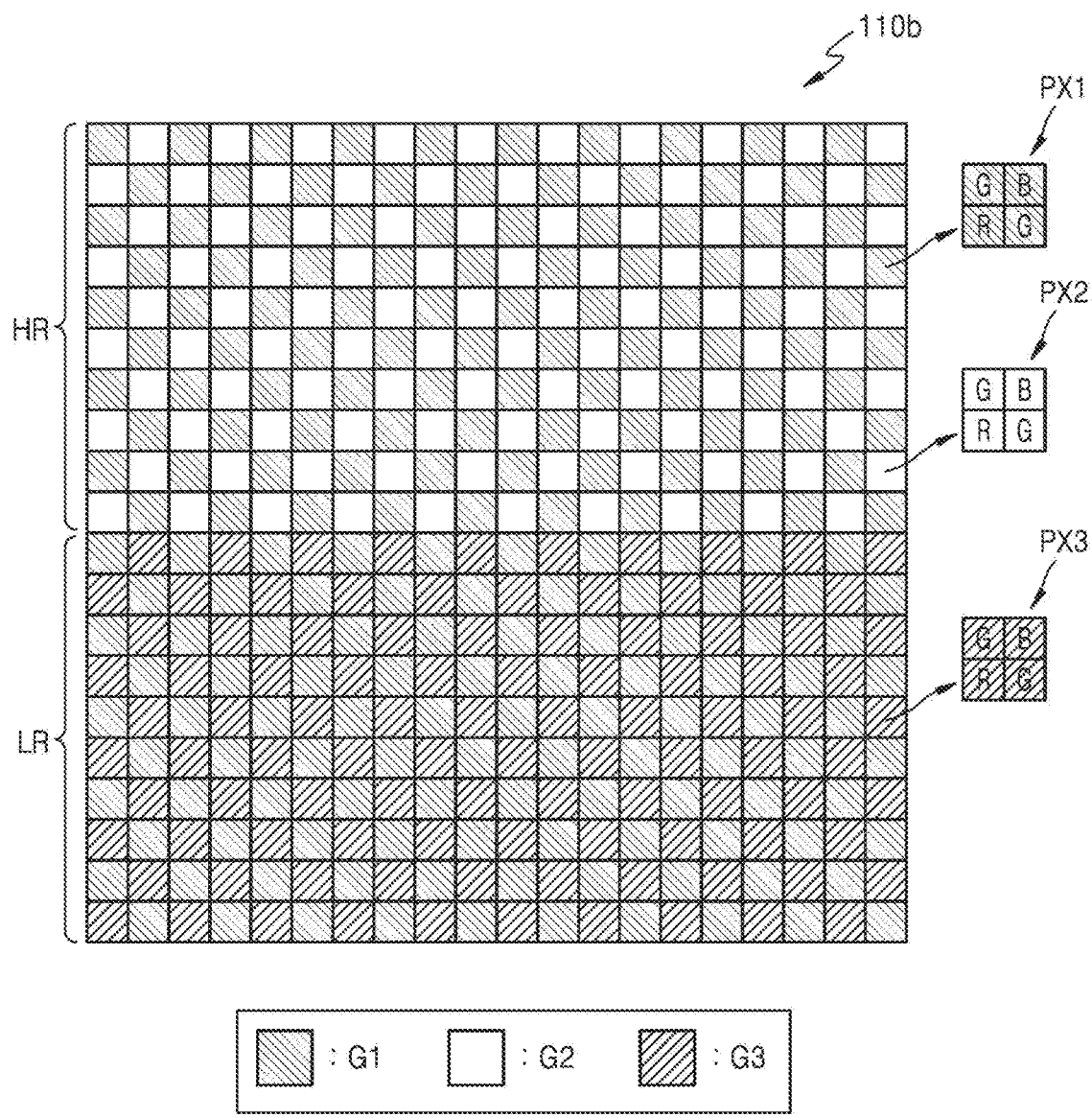

FIGS. 11A and 11B illustrate examples of pixel arrays according to some example embodiments. As described above with reference to FIG. 10, a plurality of pixels included in the pixel arrays 110*a* and 110*b* of FIGS. 11A and 11B may be grouped into two or more pixel groups, and each of the pixel groups may have its own exposure integration time. It is noted that the pixels included in the pixel arrays 110*a* and 110*b* are not limited to those illustrated in FIGS. 11A and 11B. Hereinafter, FIGS. 11A and 11B will be described with reference to FIG. 1, and redundant portions of the descriptions of FIGS. 11A and 11B will be omitted.

Referring to FIG. 11A, as described above with reference to FIG. 10, the pixel array 110*a* may be divided into two or more areas according to illuminance. For example, the pixel array 110*a* may be divided into a high illuminance area HR and a low illuminance area LR. The high illuminance area HR may correspond to a relatively high illuminance, and the low illuminance area LR may correspond to a relatively low illuminance. The low illuminance area LR may include a pixel having a longer exposure integration time, while the high illuminance area HR may include a pixel having a shorter exposure integration time. Unlike the case shown in FIG. 11A, the pixel array 110*a* may be divided into three or more areas. In some example embodiments, the area divided from the pixel array 110*a* may be classified into one of three or more areas including at least one additional area (e.g., a middle illuminance area) as well as the high illuminance area HR and the low illuminance area LR of FIG. 11A.

In some configurations, pixel array 110*a* may include a reference pixel group including pixels in fixed locations and having a fixed exposure integration time. For example, in the pixel array 110*a*, the first pixel group G1 may be a reference pixel group and may have a fixed location in the pixel array 110*a*. In particular, as the first pixel group G1 of FIG. 11A, when the reference pixel group includes some rows of the pixel array, the reference pixel group may be referred to as a reference row. It is noted that the reference pixel group is not limited to the first pixel group G1 of FIG. 11A.

The signal processor 15 may generate a set signal SET such that the high illuminance area HR includes a pixel having a short exposure integration time, and the low illuminance area LR includes a pixel having a long exposure integration time. For example, as illustrated in FIG. 11A, the signal processor 15 may generate a set signal SET such that the second pixel group G2 in the high illuminance area HR has a short exposure integration time and the third pixel group G3 in the low illuminance area LR has a long exposure integration time.

The first pixel group G1 may include pixels that are regularly distributed in the pixel array 110a independently of illuminance. For example, as shown in FIG. 11A, the first pixel group G1 may include odd rows of the pixel array 110a. In some example embodiments, the first pixel group G1 may have an exposure integration time independent of illuminance, that is, the high illuminance area HR and the low illuminance area LR. In some example embodiments, the first pixel group G1 may have an exposure integration time of 11 ms due to a light emitting diode (LED) flicker, and the second pixel group G2 of the high illuminance area HR may have an exposure integration time (e.g., 5.5 ms, 9 ms, etc.) shorter than or equal to 11 ms, and a third pixel group of the low illuminance area LR may have an exposure integration time (e.g., 22 ms) longer than or equal to 11 ms. As described above with reference to FIG. 5 and the like, it may be determined whether to perform a binning on the first pixel group G1 and the second pixel group G2 in the high illuminance are HR, and whether binning is performed on the first pixel group G1 and the third pixel group G3 in the low illuminance area LR.

Referring to FIG. 11B, the pixel array 110b may be divided into a high illuminance area HR and a low illuminance area LR. As illustrated in FIG. 11B, the signal processor 15 may generate a set signal SET such that the second pixel group G2 in the high illuminance area HR has a short exposure integration time and the third pixel group G3 in the low illuminance area LR has a long exposure integration time. The first pixel group G1 may include pixels that are regularly distributed in the pixel array 110b independently of illuminance. For example, as illustrated in FIG. 11B, the first pixel group G1 may include pixels arranged at positions corresponding to grids at equal intervals in the pixel array 110b.

In some example embodiments, each of the pixels included in the pixel group may include a plurality of sub-pixels. For example, as shown in FIGS. 11A and 11B, the first pixel PX1 included in the first pixel group G1 may include a red pixel R, two green pixels G, and a blue pixel B. In addition, the second pixel PX2 of the second pixel group G2 and the third pixel PX3 of the third pixel group G3 may also include a red pixels R, two green pixels G, and a blue pixel B. As shown in FIGS. 11A and 11B, a red pixel R, two green pixels G, and a blue pixel B corresponding to one pixel may be referred to as a Bayer pattern in an image.

Figure 12A:
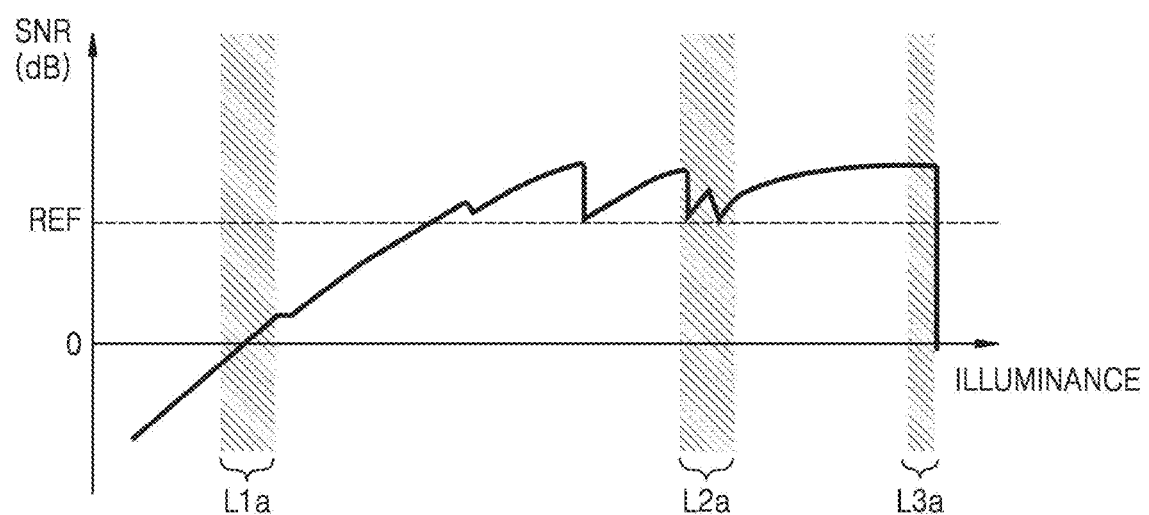
FIGS. 12A and 12B are SNR-to-HDR graphs of an image sensor according to some example embodiments.
Figure 12B:
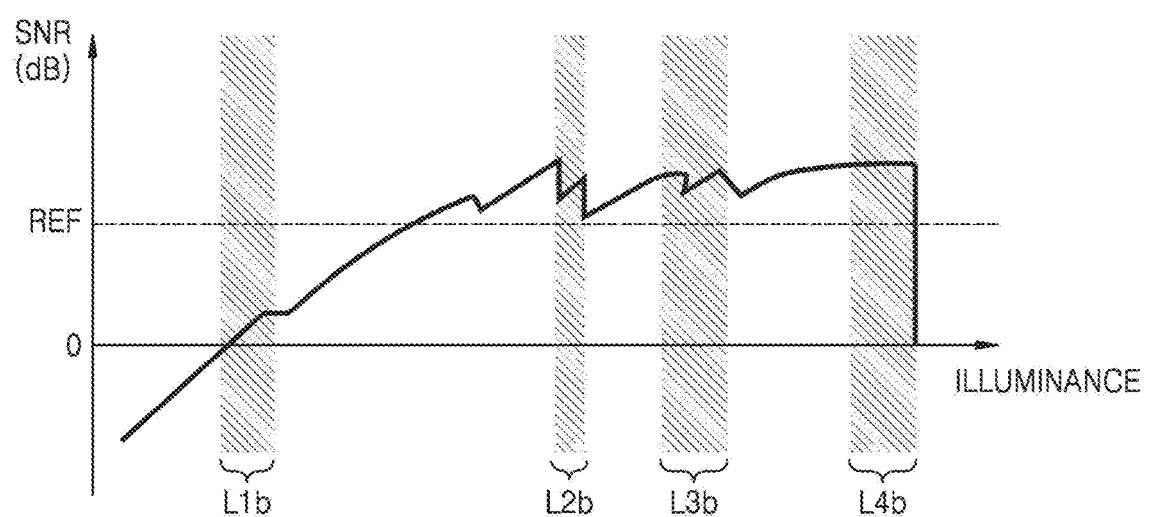

FIGS. 12A and 12B are SNR-to-HDR graphs of an image sensor 10 according to some example embodiments. Specifically, FIG. 12A shows an SNR-to-HDR graph based on selective binning of the first pixel group G1 and the second pixel group G2 in the high illuminance area HR of FIGS. 11A and 11B, and FIG. 12B shows an SNR-to-HDR graph based on selective binning of the first pixel group G1 and the third pixel group G3 in the low illuminance area LR. As shown in FIGS. 12A and 12B, SNR may be improved at a very low illuminance, SNR equal to or higher than a reference value REF may be achieved at an illuminance range excluding a low illuminance, and degradation of MTF may be prevented or reduced. Hereinafter, FIGS. 12A and 12B will be described with reference to FIGS. 11s. 11A and 11B.

Referring to FIG. 12A, selective binning may be performed on the first pixel group G1 and the second pixel group G2 in the high illuminance area HR. For example, in order to improve SNR in the first illuminance range L1a and the second illuminance range L2a, binning may be performed on the first pixel group G1 and the second pixel group G2 based on the same first weight and second weight. In addition, in order to expand the HDR in the third illuminance range L3a, binning may be performed on the first pixel group G1 and the second pixel group G2 based on the first weight of zero and the second weight greater than zero, and accordingly, only a value corresponding to the second pixel group G2 may be used.

Referring to FIG. 12B, selective binning may be performed on the first pixel group G1 and the third pixel group G3 in the low illuminance area LR. For example, in order to improve SNR in the first illuminance range L1b and the second illuminance range L2b, binning may be performed on the first pixel group G1 and the third pixel group G3 based on the same first weight and third weight. In addition, in the third illuminance range L3b and the fourth illuminance range L4b, binning may be performed on the first pixel group G1 and the third pixel group G3 based on the first weight of zero and the third weight greater than zero, and thus, only a value corresponding to the third pixel group G3 may be used.

Figure 13:
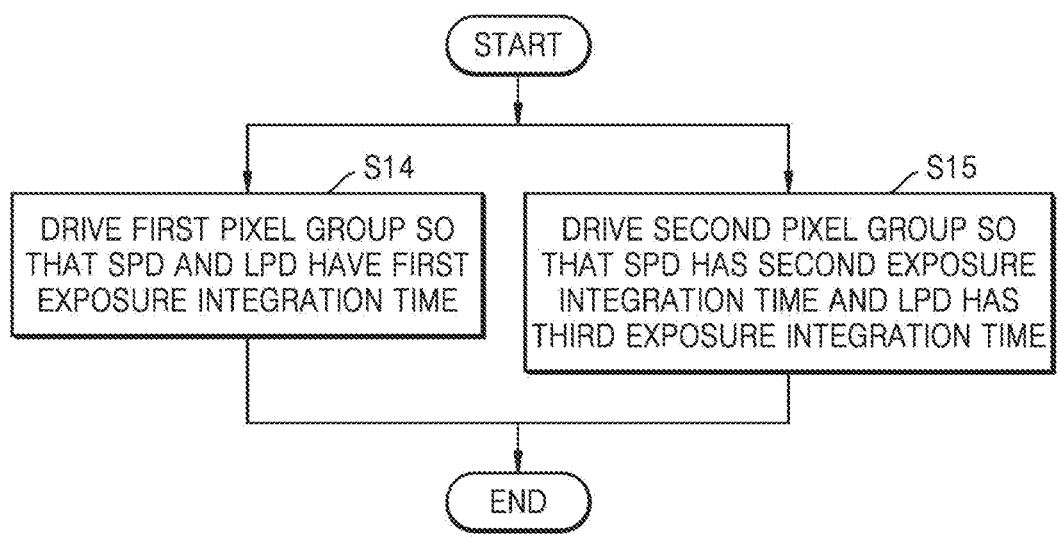
FIG. 13 is a flowchart illustrating an operating method of an image sensor according to some example embodiments.

FIG. 13 is a flowchart illustrating a method performed by an image sensor 10 according to some example embodiments. As shown in FIG. 13, the method performed by the image sensor 10 may include operations S14 and S15 performed in parallel with each other. In some example embodiments, the method of FIG. 13 may be performed prior to operation S20 of FIG. 5. Hereinafter, FIG. 13 will be described with reference to FIG. 1.

In operation S14, the first pixel group may be driven so that the small photodiode SPD and the large photodiode LPD have a first exposure integration time. For example, the controller 14 may control the driver 12 so that the first pixel group has a fixed first exposure integration time (e.g., 11 ms). The first pixel group may include regularly distributed pixels, as described below with reference to FIG. 14.

In operation S15, the second pixel group may be driven so that the small photodiode SPD has a second exposure integration time and the large photodiode LPD has a third exposure integration time. For example, the second exposure integration time may be shorter than or equal to the first exposure integration time, and the third exposure integration time may be longer than or equal to the second exposure integration time. The controller 14 may control the driver 12 so that the small photodiode SPD of the second pixel group has a fixed second exposure integration time (e.g., 5.5 ms) and the large photodiode LPD of the second pixel group has a fixed third exposure integration time (e.g., 22 ms). That is, unlike the second pixel group of FIG. 10, the second pixel group of FIG. 13 may be fixed like the first pixel group, and may have a fixed second exposure integration time and a fixed third exposure integration time.

Figure 14:
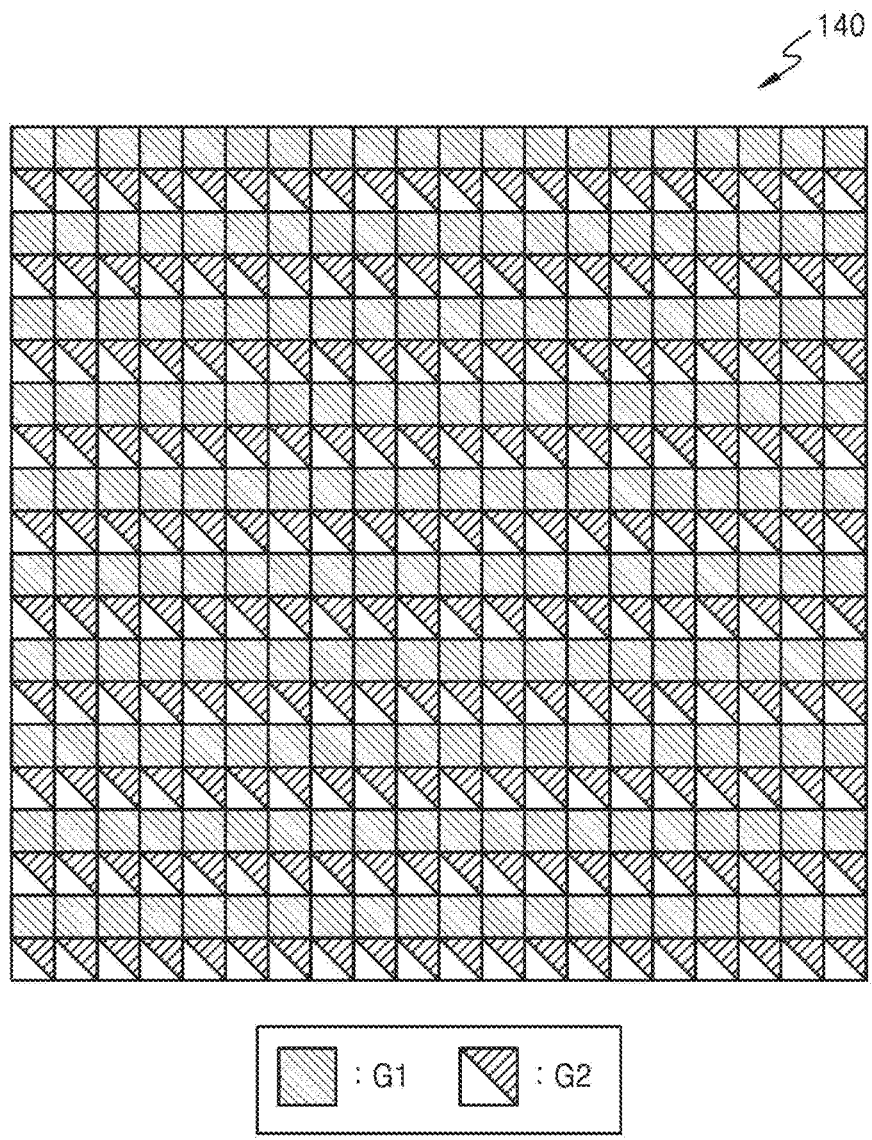
FIG. 14 illustrates a pixel array according to some example embodiments.
Figure 14:

FIG. 14 illustrates a pixel array 140 according to some example embodiments. As described above with reference to FIG. 13, the pixel array 140 may include the first pixel group G1 and the second pixel group G2, and each of the first pixel group G1 and the second pixel group G2 may have its own exposure integration time. It is noted that the pixels included in the pixel array 140 are not limited to those illustrated in FIG. 14. Hereinafter, FIG. 14 will be described with reference to FIG. 1.

As described above with reference to FIG. 13, the first pixel group G1 may include regularly distributed pixels, and the second pixel group G2 may also include regularly distributed pixels. Unlike the pixel array 110 of FIG. 11, the pixel array 140 of FIG. 14 may not be divided into a high illuminance area HR and a low illuminance area LR. The small photodiode SPD and the large photodiode LPD of the first pixel group G1 may have a first exposure integration time (e.g., 11 ms). In addition, the small photodiode SPD of the second pixel group G2 may have a second exposure integration time (e.g., 5.5 ms), and the large photodiode LPD of the second pixel group G2 may have a third exposure integration time (e.g., 22 ms).

Figures 15A, 15B:
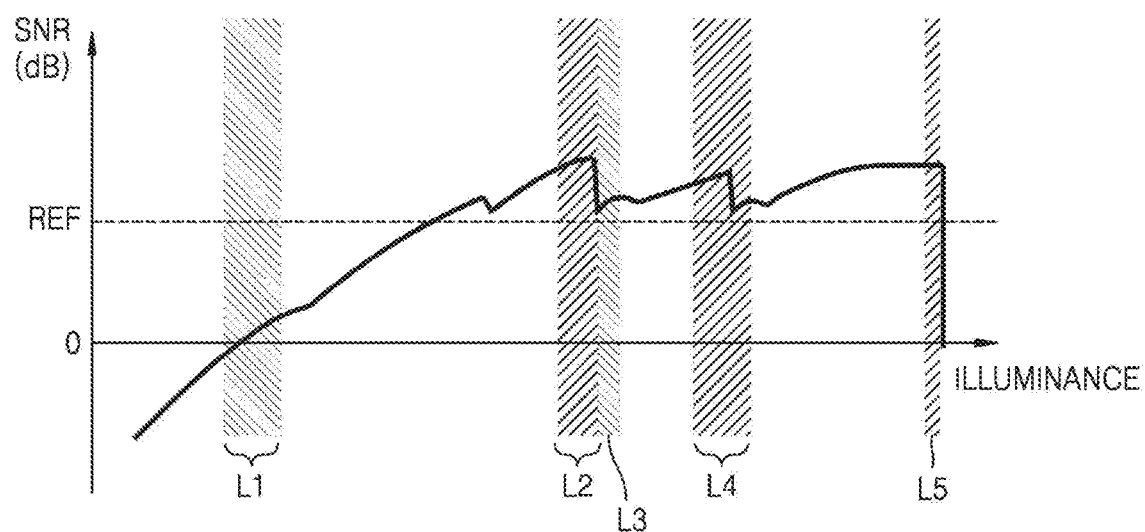
FIG. 15A is an SNR-to-HDR graph of an image sensor according to some example embodiments.
FIG. 15B illustrates a table indicating a binning scheme according to some example embodiments.

FIG. 15A is an SNR-to-HDR graph of an image sensor 10 according to some example embodiments, and FIG. 15B shows a table indicating a binning scheme. Specifically, FIG. 15A shows an SNR-to-HDR graph based on selective binning for the first pixel group G1 and the second pixel group G2 in the pixel array 140 of FIG. 14, and FIG. 15B shows a table indicating a binning scheme according to an illuminance range. The table of FIG. 15B shows values of a first pixel PX1' and a second pixel PX2' to which binning is applied when a value of a first pixel PX1 included in the first pixel group G1 is A and a value of a second pixel PX2 included in the second pixel group G2 is B.

Referring to the graph of FIG. 15A, binning may be performed in the first to fifth illuminance ranges L1 to L5. For example, in the first illuminance range L1, the first pixel PX1' and the second pixel PX2' to which binning is applied may correspond to an average of values A and B. That is, each of the first weight and the second weight may be 0.5. The first pixel PX1' and the second pixel PX2' to which binning is applied in the second illuminance range L2 may be equal to the value A of the first pixel PX1 of the first pixel group G1. That is, the first weight may be 1, and the second weight may be zero. In the third illuminance range L3, the first pixel PX1' and the second pixel PX2' to which binning is applied may correspond to the average of the values A and B. That is, each of the first weight and the second weight may be 0.5. The values of the first pixel PX1' and the second pixel PX2' to which the binning is applied in the fourth illuminance range L4 and the fifth illuminance range L5 may be the same as the value B of the second pixel PX2 of the second pixel group G2. That is, the first weight may be zero, and the second weight may be 1. As described above with reference to FIG. 9, the signal processor 15 may identify a first weight and a second weight to be used for binning according to a range to which illuminance belongs.

Figure 16:
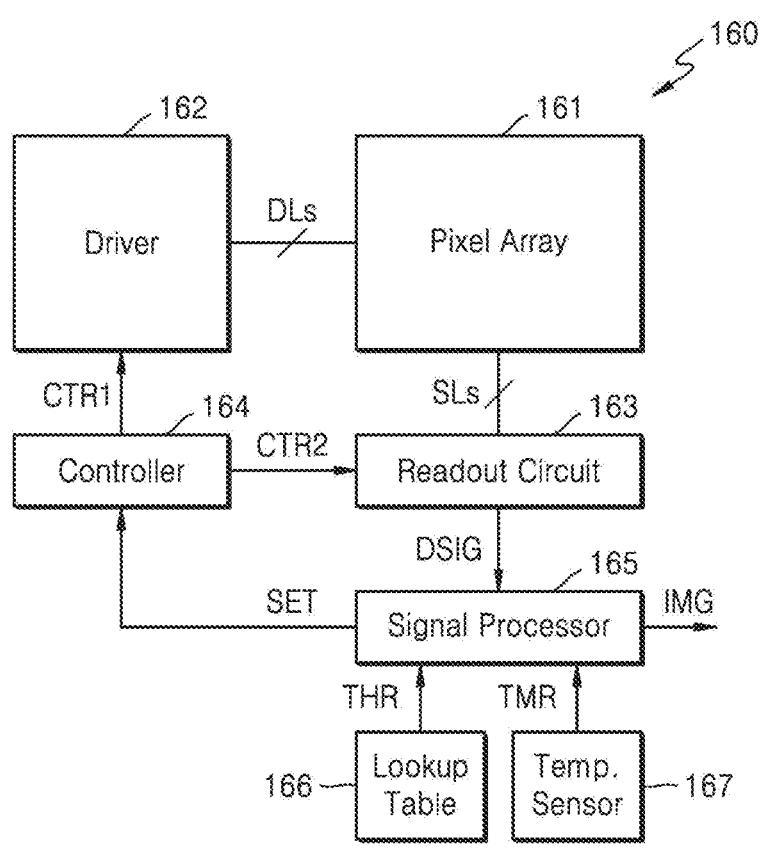
FIG. 16 is a block diagram illustrating an image sensor according to some example embodiments.

FIG. 16 is a block diagram illustrating an image sensor 160 according to some example embodiments. Similar to the image sensor of FIG. 1, the image sensor 160 of FIG. 16 may include a pixel array 161, a driver 162, a readout circuit 163, a controller 164, a signal processor 165 and a lookup table 166, and may further include a temperature sensor 167. Hereinafter, redundant portions of the description of FIG. 1 among the descriptions of FIG. 16 will be omitted.

In some example embodiments, the signal processor 165 may determine whether to perform a binning based on the temperature of the image sensor 160 as well as the value of the digital signal DSIG. For example, the temperature sensor 167 may sense the temperature of the image sensor 160 (or the pixel array 161), and may provide a temperature signal TMR indicating the sensed temperature to the signal processor 165. The signal processor 165 may identify the temperature of the image sensor 160 based on the temperature signal TMR, and may use the temperature to determine whether to perform a binning.

When the temperature of the image sensor 160 increases, noise characteristics of the pixel array 161 may deteriorate. For example, a dark signal non-uniformity (DSNU) that may occur at a boundary between different modes may degrade at a high temperature, thereby causing an illuminance range having an SNR below a reference value (REF). Accordingly, the signal processor 165 may not perform binning to prevent or reduce degradation of the MTF when the temperature of the image sensor 160 is not high within a specific illuminance range, but may perform binning to prevent or reduce SNR degradation when the temperature of the image sensor 160 is high. An example of an operation of the image sensor 160 will be described with reference to FIG. 17.

Figure 17:
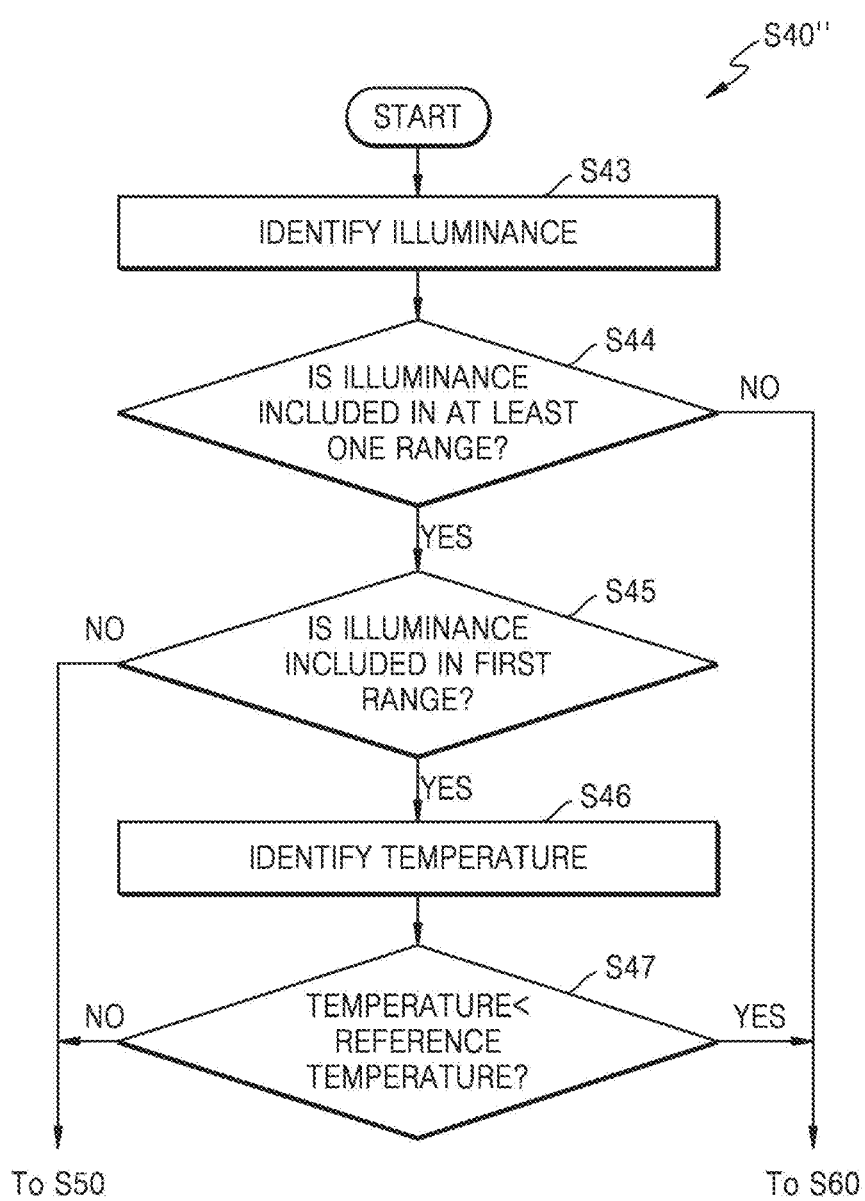
FIG. 17 is a flowchart illustrating an operating method of an image sensor according to some example embodiments.

FIG. 17 is a flowchart illustrating a method performed by an image sensor 160 according to some example embodiments. Specifically, the flowchart of FIG. 17 illustrates an example of operation S40 of FIG. 5. As described above with reference to FIG. 5, it may be determined whether to perform a binning in operation S40" of FIG. 17. As shown in FIG. 17, operation S40" may include a plurality of operations S43 to S47. Hereinafter, FIG. 17 will be described with reference to FIG. 16.

Referring to FIG. 17, illuminance may be identified in operation S43. For example, the signal processor 165 may identify the illuminance of a pixel or an area including at least one pixel based on a value of the digital signal DSIG. In some example embodiments, the signal processor 165 may identify the illuminance based on the value of the image data IMG, and in this case, the identified illuminance may correspond to a previous frame of a frame corresponding to the digital signal DSIG currently output from the readout circuit 163. In some example embodiments, when operation S11 of FIG. 10 is performed prior to operation S20 of FIG. 5, the performance of operation S43 may be omitted.

In operation S44, it may be determined whether the illuminance is included in at least one range. For example, when the illuminance is not included in at least one illuminance range, the signal processor 165 may determine that binning is not performed, and accordingly, as shown in FIG. 17, operation S60 of FIG. 5 may be subsequently performed.

When the illuminance is included in at least one range, it may be determined whether the illuminance is included in a first range in operation S45. As described above with reference to FIG. 16, the first range may correspond to an illuminance range requiring binning to improve SNR at a high temperature. As shown in FIG. 17, when the illuminance is included in a range different from the first range, the signal processor 165 may determine to perform binning, and accordingly, as shown in FIG. 17, operation S50 of FIG. 5 may be subsequently performed.

When the illuminance is included in the first range, the temperature may be identified in operation S46. For example, the signal processor 165 may identify the temperature of the image sensor 160 based on the temperature signal TMR provided from the temperature sensor 167.

In operation S47, it may be determined whether the temperature is less than the reference temperature. For example, when the temperature identified in operation S46 is less than the reference temperature, the signal processor 165 may determine not to perform the binning in the first range, and accordingly, as shown in FIG. 17, operation S60 of FIG. 5 may be subsequently performed. Meanwhile, when the temperature identified in operation S46 is equal to or greater than the reference temperature, the signal processor 165 may determine to perform the binning in the first range, and accordingly, as shown in FIG. 17, operation S50 of FIG. 5 may be subsequently performed.

Figure 18:
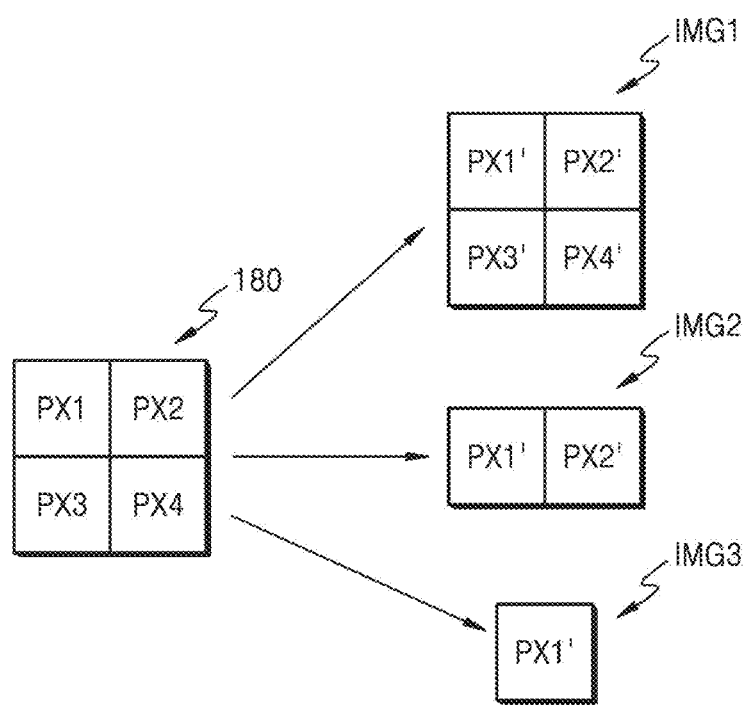
FIG. 18 is a diagram illustrating examples of operations performed by an image sensor according to some example embodiments.

FIG. 18 is a diagram illustrating examples of operations of an image sensor 10 according to some example embodiments. Specifically, FIG. 18 illustrates examples of binning performed by the signal processor 15 of FIG. 1. As described above with reference to the drawings, the signal processor 15 may perform an operation on values of the digital signal DSIG corresponding to the pixel groups, and may generate image data IMG based on the operation result. Hereinafter, FIG. 18 will be described with reference to FIG. 1.

Referring to FIG. 18, the resolution of the image data IMG may vary by binning. For example, as shown in FIG. 18, first to third image data IMG1 to IMG3 of different resolutions may be generated from first to fourth pixels PX1 to PX4 adjacent to each other in the pixel array 180. The first image data IMG1 may have a resolution corresponding to the pixel array 180. In some example embodiments, values of the first pixel PX1' and the third pixel PX3' of the first image data IMG1 may be generated by the binning of the first pixel PX1 and the third pixel PX3 of the pixel array 180, and values of the second pixel PX2' and the fourth pixel PX4' of the first image data IMG1 may be generated by the binning of the second pixel PX2 and the fourth pixel PX4 of the pixel array 180. In some example embodiments, values of the first to fourth pixels PX1' to PX4' of the first image data IMG1 may be generated by the binning of the first to fourth pixels PX1 to PX4 of the pixel array 180.

The value of the first pixel PX1' of the second image data IMG2 may be generated by the binning of the first pixel PX1 and the third pixel PX3 of the pixel array 180, and the value of the second pixel PX2' of the second image data IMG2 may be generated by the binning of the second pixel PX2 and the fourth pixel PX4 of the pixel array 180. Accordingly, the second image data IMG2 may correspond to an image having a lower resolution than the first image data IMG1. In addition, the value of the first pixel PX1' of the third image data IMG3 may be generated by the binning of the first to fourth pixels PX1 to PX4 of the pixel array 180. Accordingly, the third image data IMG3 may correspond to an image having a lower resolution than the first image data IMG1 and the second image data IMG2.

As described above with reference to FIGS. 11A and 11B, in some example embodiments, the pixel array 180 may include a high illuminance area HR and a low illuminance area LR. In addition, pixels adjacent to each other in each of the high illuminance area HR and the low illuminance area LR may have different exposure integration times, respectively. For example, the first pixel PX1 and the second pixel PX2 of the pixel array 180 may have an exposure integration time that is shorter than or equal to the third pixel PX3 and the fourth pixel PX4, or the first pixel PX1 and the second pixel PX2 of the pixel array 180 may have an exposure integration time that is longer than or equal to the third pixel PX3 and the fourth pixel PX4. In this way, normalization may be performed in binning to compensate for different exposure integration times. For example, when the exposure integration times of the first pixel PX1 and the second pixel PX2 are less than or equal to the exposure integration times of the third pixel PX3 and the fourth pixel PX4, values of the digital signals DSIG corresponding to the first pixel PX1 and the second pixel PX2 may be amplified or values of the digital signals DSIG corresponding to the third pixel PX3 and fourth pixel PX4 may be attenuated. The signal processor 15 may perform binning based on normalized values, for example, based on a weighted sum of normalized values.

The image sensor 10 (or other circuitry, for example, the driver 12, the readout circuit 13, the controller 14, the signal processor 15, the lookup table 16, binning block 81, 83, comparison block 82, 84, and the image sensor 160 and subcomponents) may include hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

While the inventive concept has been particularly shown and described with reference to some example embodiments thereof, it will be understood that various changes in form and details may be made therein without departing from the spirit and scope of the following claims.

What is claimed is:

1. An image sensor comprising:
   a pixel array including a plurality of pixels;
   a readout circuit configured to generate a digital signal based on a pixel signal received from the pixel array; and
   a signal processor configured to
      determine whether to perform a binning on a first pixel group and a second pixel group among the plurality of pixels based on at least one of a first value of the digital signal corresponding to the first pixel group independent of the second pixel group and a second value of the digital signal corresponding to the second pixel group adjacent to the first pixel group independent of the first pixel group, and
      generate image data based on a first operation with the first value and the second value as operands when the binning is determined to be performed.

2. The image sensor of claim 1, wherein the signal processor is further configured to generate the image data based on a second operation with the first value as an operand and independent of the second value and a third operation with the second value as an operand and independent of the first value when the binning is determined not to be performed.

3. The image sensor of claim 1, wherein the signal processor is further configured to
   identify illuminance based on at least one of the first value and the second value, and
   determine to perform the binning when the illuminance is in at least one illumination range.

4. The image sensor of claim 3, wherein the at least one illumination range comprises a range in which the illuminance is less than a first threshold value.

5. The image sensor of claim 3, wherein
   each of the first value and the second value comprises values corresponding to a plurality of modes, and
   the at least one illumination range comprises a range including a boundary between two modes among the plurality of modes.

6. The image sensor of claim 5, wherein the plurality of modes comprise a mode corresponding to a first conversion gain of each of the plurality of pixels and a mode corresponding to a second conversion gain of each of the plurality of pixels.

7. The image sensor of claim 5, wherein
   each of the plurality of pixels comprises a first photoelectric device and a second photoelectric device larger than the first photoelectric device, and
   the plurality of modes comprise a mode corresponding to charges accumulated by the first photoelectric device and a mode corresponding to charges accumulated by the second photoelectric device.

8. The image sensor of claim 3, wherein the first operation is a weighted sum of the first value and the second value.

9. The image sensor of claim 8, wherein the signal processor is further configured to identify a first weight of the first value and a second weight of the second value, based on the at least one illumination range including the illuminance.

10. The image sensor of claim 1, further comprising:
a driver configured to drive the pixel array; and
a controller configured to control the driver so that the first pixel group and the second pixel group have a first exposure integration time and a second exposure integration time, respectively.

11. The image sensor of claim 10, wherein
the signal processor is further configured to
identify illuminance based on at least one of the first value and the second value,
identify the second pixel group and the second exposure integration time based on the illuminance, and
set the controller based on the identified second pixel group and the identified second exposure integration time, and
the first pixel group is independent of the illuminance.

12. The image sensor of claim 1, wherein
each of the plurality of pixels comprises a first photoelectric device and a second photoelectric device larger than the first photoelectric device, and
further comprising:
a driver configured to drive the pixel array; and
a controller configured to control the driver such that the first pixel group has a first exposure integration time, the first photoelectric device of the second pixel group has a second exposure integration time less than or equal to the first exposure integration time, and the second photoelectric device of the second pixel group has a third exposure integration time greater than or equal to the second exposure integration time.

13. The image sensor of claim 1, wherein the signal processor is further configured to
identify a temperature of the image sensor from a temperature signal and
determine whether to perform the binning based on the temperature and at least one of the first value and the second value.

14. An image sensor comprising:
a pixel array including a plurality of pixels including a first pixel group and a second pixel group adjacent to the first pixel group;
a readout circuit configured to generate a digital signal from a pixel signal received from the pixel array; and
a signal processor configured to
identify illuminance based on at least one of a first value of the digital signal corresponding to the first pixel group independent of the second pixel group and a second value of the digital signal corresponding to the second pixel group, and
generate image data based on a first operation with the first value and the second value as operands when the illuminance is less than or equal to a first threshold.

15. The image sensor of claim 14, wherein the signal processor is further configured to generate the image data based on a second calculation with the first value as an operand and independent of the second value and a third calculation with the second value as an operand and independent of the first value, when the illuminance is greater than or equal to the first threshold or less than a second threshold.

16. The image sensor of claim 15, wherein the signal processor is further configured to generate the image data when a fourth operation with the first value and the second value as operands, based on the illuminance is greater than or equal to the second threshold or less than a third threshold.

17. The image sensor of claim 16, wherein the signal processor is further configured to generate the image data based on a fifth operation with the first value as an operand and independent of the second value and a sixth operation with the second value as an operand and independent of the first value, when the illuminance is greater than or equal to the third threshold or less than a fourth threshold.

18. An operating method of an image sensor, the operating method comprising:
generating a digital signal from a pixel signal received from a pixel array including a plurality of pixels;
determining whether to perform a binning on a first pixel group and a second pixel group among the plurality of pixels based on whether at least one of a first value of the digital signal corresponding to the first pixel group independent of the second pixel group and a second value of the digital signal corresponding to the second pixel group adjacent to the first pixel group independent of the first pixel group falls within a range defined by at least one threshold value; and
generating image data based on a first operation with the first value and the second value as operands when the binning is determined to be performed.

19. The operating method of claim 18, further comprising generating the image data based on a second operation with the first value as an operand and independent of the second value and a third operation with the second value as an operand and independent of the first value when the binning is determined not to be performed.

20. The operating method of claim 18, wherein the determining whether to perform the binning comprises:
identifying illuminance based on at least one of the first value and the second value; and
determining to perform the binning when the illuminance is included in at least one illumination range.

* * * * *